United States Patent
Homme et al.

(10) Patent No.: US 12,146,658 B2
(45) Date of Patent: Nov. 19, 2024

(54) SYSTEMS AND METHODS FOR MANAGING AND UTILIZING EXCESS CORN RESIDUE

(71) Applicant: Biomass Products, LLC, Spicer, MN (US)

(72) Inventors: Truman K. Homme, Spicer, MN (US); Philip E. Tollefson, Portland, OR (US); William F. Fuehrer, North Oaks, MN (US)

(73) Assignee: Biomass Products, LLC, Spicer, MN (US)

( * ) Notice: Subject to any disclaimer, the term of this patent is extended or adjusted under 35 U.S.C. 154(b) by 328 days.

(21) Appl. No.: 16/999,710

(22) Filed: Aug. 21, 2020

(65) Prior Publication Data

US 2021/0071867 A1    Mar. 11, 2021

Related U.S. Application Data

(60) Continuation of application No. 14/249,114, filed on Apr. 9, 2014, now abandoned, which is a division of application No. 12/946,474, filed on Nov. 15, 2010, now Pat. No. 8,712,787.

(51) Int. Cl.
| | |
|---|---|
| F23G 7/10 | (2006.01) |
| G06Q 10/00 | (2023.01) |
| G06Q 50/00 | (2024.01) |
| G06Q 99/00 | (2006.01) |

(52) U.S. Cl.
CPC .............. *F23G 7/10* (2013.01); *G06Q 10/00* (2013.01); *G06Q 50/00* (2013.01); *G06Q 99/00* (2013.01); *Y02E 20/12* (2013.01)

(58) Field of Classification Search
CPC ...... F23G 5/033; F23G 7/10; F23G 2209/262; C10L 5/44
See application file for complete search history.

(56) References Cited

U.S. PATENT DOCUMENTS

| | | | | |
|---|---|---|---|---|
| 2,796,198 | A | * | 6/1957 | Weigel .................... F23G 5/444 241/101.5 |
| 3,923,489 | A | * | 12/1975 | Richardson ............. C05C 3/005 71/61 |
| 4,203,374 | A | * | 5/1980 | Frederick .................. F23G 7/10 110/255 |
| 4,414,813 | A | * | 11/1983 | Knapp ...................... F23K 1/04 60/648 |
| 5,189,964 | A | * | 3/1993 | Rich, Jr. ................... F23K 1/00 110/232 |
| 5,803,020 | A | * | 9/1998 | Palmgren ................ F22B 31/00 110/238 |
| 5,901,541 | A | | 5/1999 | Lindquist |

(Continued)

OTHER PUBLICATIONS

"we Energies' 50 MW Biomass-Fired Cogeneration Facility to be Located at the Domtar-Rothschild Mill"; Mar. 2010, 69 pages.

(Continued)

*Primary Examiner* — David J Laux
(74) *Attorney, Agent, or Firm* — Merchant & Gould P.C.

(57) ABSTRACT

Systems and methods for managing excess above-ground corn residue are disclosed. Systems and methods for combusting corn residue to produce heat for generating steam are also disclosed. Additionally, methods and systems for harvesting and pre-processing corn residue prior to combustion of the corn residue are disclosed.

20 Claims, 16 Drawing Sheets

(56) References Cited

U.S. PATENT DOCUMENTS

| | | | | |
|---|---|---|---|---|
| 5,937,772 | A * | 8/1999 | Khinkis | F23G 5/002 110/165 A |
| 6,381,962 | B1 * | 5/2002 | Ohshita | F23G 5/46 60/645 |
| 6,439,138 | B1 * | 8/2002 | Teller | B01J 20/20 95/107 |
| 6,502,520 | B1 * | 1/2003 | Nishi | F23G 5/16 110/211 |
| 7,793,601 | B2 * | 9/2010 | Davison | F23G 7/10 110/165 R |
| 8,349,282 | B2 * | 1/2013 | Zwahr | F23J 15/006 110/255 |
| 8,712,787 | B2 | 4/2014 | Homme et al. | |
| 2003/0136127 | A1 | 7/2003 | Thiessen | |
| 2003/0196577 | A1 * | 10/2003 | Lefcort | F23H 1/02 110/342 |
| 2004/0129188 | A1 * | 7/2004 | Traina | F23G 5/006 110/341 |
| 2005/0274308 | A1 | 12/2005 | Copeland et al. | |
| 2006/0225424 | A1 * | 10/2006 | Elliott | F23G 5/444 60/722 |
| 2007/0266916 | A1 | 11/2007 | Copeland et al. | |
| 2008/0171369 | A1 | 7/2008 | Shulman | |
| 2008/0193351 | A9 * | 8/2008 | Boardman | B01D 53/46 423/210 |
| 2010/0139156 | A1 * | 6/2010 | Mennell | C10L 5/48 44/590 |
| 2010/0281767 | A1 | 11/2010 | Zeeck | |
| 2010/0319595 | A1 * | 12/2010 | Sweeten | F23G 7/10 44/500 |
| 2011/0191256 | A1 * | 8/2011 | Sayre | G06Q 50/06 705/317 |
| 2011/0232284 | A1 * | 9/2011 | Natta | F23G 5/006 110/223 |

OTHER PUBLICATIONS

Al-Kaisi, M. et al., "Managing Residue for a Good Stand," Integrated Crop Management, http://www.extension.iastate.edu/CropNews/2008/0402AlKaisiHanna.htm, 1 page (Apr. 2, 2008).

Al-Kaisi, M., "Tillage Challenges in Managing Continuous Corn," Integrated Crop Management, IC-498 (1), http://www.ipm.iastate.edu/ipm/icm/2007/2-12/tillagechallenge.html, 3 pages (Feb. 12, 2007).

Alkali metal, Wikipedia, the free encyclopedia, http://en.wikipedia.org/wiki/Alkali_metal, 4 pages (Oct. 20, 2010).

Alkaline earth metal, Wikipedia, the free encyclopedia, http://en.wikipedia.org/wiki/Alkaline_earth_metal, 4 pages (Oct. 21, 2010).

Anderson, M., "Cropping Practices," Agricultural Resources and Environmental Indicators, pp. 118-142 (1994).

Andrews, S., "Crop Residue Removal for Biomass Energy Production: Effects on Soils and Recommendations," White Paper, 15 pages (Feb. 22, 2006).

Biomass Boiler Systems, 6 pages, http://www.mcburney.com/biomass.htm (Printed on Oct. 18, 2010).

Biomass Cofiring in Coal-Fired Boilers, U.S. Department of Energy, DOE/EE-0288, pp. 1-34 (Jun. 2004).

Biomass Cofiring: A Renewable Alternative for Utilities, U.S. Department of Energy, DOE/GO-102000-1055, 2 pages (Jun. 2000).

Biomass for Electricity Generation, U.S. Energy Information Administration, http://www.eia.doe.gov/oiaf/analysispaper/biomass/, 12 pages (Printed on Oct. 25, 2010).

Biomass, Wikipedia, the free encyclopedia, http://en.wikipedia.org/wiki/Biomass, 6 pages (Oct. 19, 2010).

Boiler, Wikipedia, the free encyclopedia, http://en.wikipedia.org/wiki/Boiler, 9 pages (Oct. 17, 2010).

Caspers-Simmet, J., "POET's Project Library hopes to attract farmers, cobs," Agri News, http://www.agrinews.com/poets/project/liberty/hopes/to/attract/farmers/cobs/story-1039.htm, 2 pages (Nov. 19, 2009).

Ciolkosz, D., "Co-firing Biomass with Coal," Renewable and Alternative Energy Fact Sheet, pp. 1-4 (2010).

Co-firing of Biomass in Coal Fired Boilers, "Hot Topics Hour", Prairie Lands Bio-Products, Inc., 23 pages (Mar. 19, 2009).

Corn stover, Wikipedia, the free encyclopedia, http://en.wikipedia.org/w/index.php?title=Corn_stover&printable=yes, 3 pages (Dec. 8, 2009).

Coulter, J., "Avoid Excessive Harvest of Corn Residue to Maintain Soil Productivity," Minnesota Crop News, http://www.extension.umn.edu/cropnews/2008/08MNCN28.html, 4 pages (Sep. 11, 2008).

Coulter, J. et al., "Corn Response to Residue Management and Nitrogen Fertilization," 1 page (Publicly available prior to Nov. 15, 2010).

Dejong-Hughes, J. et al., "Considerations for Corn Residue Harvest in Minnesota," University of Minnesota Extension, http://www.extension.umn.edu/distribution/cropsystems/M1243.html, 3 pages (Copyright 2009).

Dejong-Hughes, J. et al., "Maintain soil organic matter when harvesting corn residue," University of Minnesota Extension, http://www.extension.umn.edu/extensionnews/2009/maintain-soil-organic-html, 2 pages (Apr. 6, 2009).

Hess, J. et al., "Biomass Resource Feedstock Supply," Idaho National Laboratory, 22 pages (Sep. 2006).

http://www.agry.purdue.edu/ext/corn/pubs/agry9509.htm; from way back machine Sep. 2006; 3 pages.

http://www.thomasnet.com/products/steam-generators-34621003-1.html; from way back machine Apr. 2009; 12 pages.

http://www3.iptv.org/exploremore/energy/profiles/biomass.cfm; from way back machine Oct. 2007; 3 pages.

International Search Report and Written Opinion mailed Aug. 23, 2011.

Leu, B. et al., "Grazing Corn Residue using resources and reducing costs," Iowa State University, University Extension, 4 pages (Aug. 2009).

Moncrief, J., "Tips for Profitable Crop Residue Management Systems," University of Minnesota Extension, http://www.extension.umn.edu/distribution/cropsystems/DC6049html, 2 pages (Copyright 2002).

Morrison, L., "A Second Crop From Your Cornfields?," Corn and Soybean Digest, http://cornandsoybeandigest.com/second-crop-your-cornfields, 2 pages (Jan. 1, 2009).

Myers, D. et al., "Harvesting Corn Residue," Ohio State University Extension Department of Horticulture and Crop Science, AGF-003-92, http://ohioline.osu.edu/agf-fact/0003.html, 4 pages (Printed on Oct. 21, 2010).

Petrolia, D., "Economics of Crop Residues: Corn Stover," Agronomy/Forestry, Little Rock, Arkansas, 2 pages (Jun. 2009).

Poet Project Liberty, U.S. Department of Energy, 1 page (Publicly available prior to Nov. 15, 2010).

Samples, D. et al., "Grazing Corn Residue," Ohio State University Fact Sheet, http://ohioline.osu.edu/anr-fact/0010-html, 6 pages (Printed on Oct. 21, 2010).

Schill, S., "Organizing Biomass Farmers," Biomass Magazine, http://www.biomassmagazine.com/articles/1528/organizing-biomass-farmers, 3 pages (Printed on Oct. 25, 2010).

Steam drum, Wikipedia, the free encyclopedia, http://en.wikipedia.org/wiki/Steam_drum, 1 page (Oct. 12, 2009).

Steam turbine, Wikipedia, the free encyclopedia, http://en.wikipedia.org/wiki/Steam_turbine, 7 pages (Oct. 19, 2010).

The Economics of Harvesting Corn Cobs for Energy, Project Liberty, http://blog.projectliberty.com/2010/08/the-economics-of-harvesting-corn-cobs-for-energy . . . , 3 pages (Aug. 10, 2010).

Wilhelm, W. et al., "Corn and Soybean Yield Response to Crop Residue Management Under No-Tillage Production Systems," Agronomy Journal., vol. 78, pp. 184-189 (Jan.-Feb. 1986).

Wilhelm, W. et al., "Crop and Soil Productivity Response to Corn Residue Removal: A Literature Review," Agronomy Journal, vol. 96, No. 1, pp. 1-17 (Jan.-Feb. 2004).

Zhang Wei et al., "Engineering Design of Direct Combustion Electricity Generation with Yellow Stalk in Wangkui," Electric Power Survey & Design, Issue 1, pp. 35-39 (Feb. 2008).

* cited by examiner

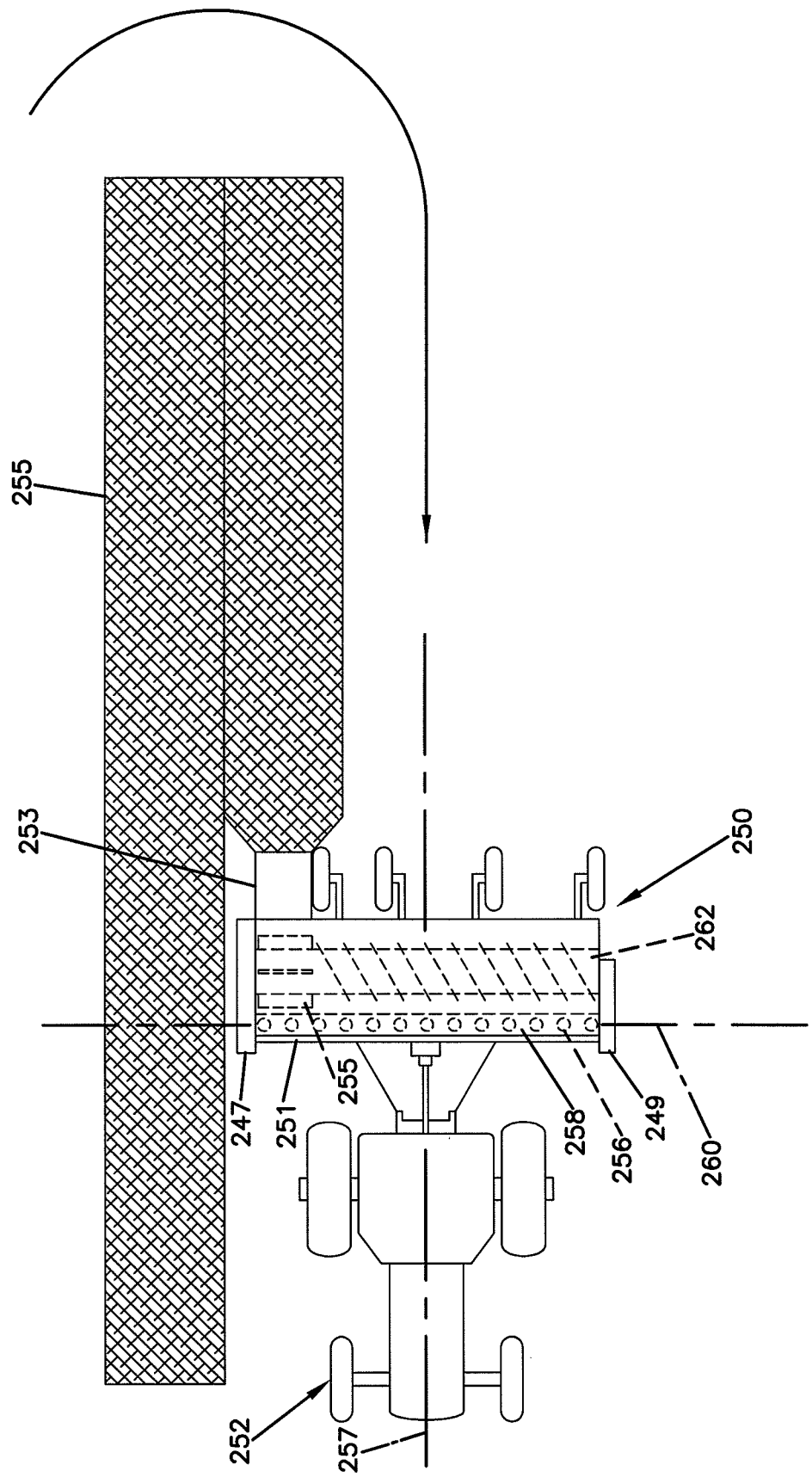

SYSTEMS AND METHODS FOR MANAGING AND UTILIZING EXCESS CORN RESIDUE

CROSS REFERENCE TO RELATED APPLICATION

This application is a continuation of application Ser. No. 14/249,114, filed Apr. 9, 2014, which is a divisional of application Ser. No. 12/946,474, filed Nov. 15, 2010, now U.S. Pat. No. 8,712,787, which applications are incorporated herein by reference in their entirety.

TECHNICAL FIELD

The present disclosure relates generally to systems and methods for using biomass as fuel for generating power.

BACKGROUND

Above-ground corn residue (i.e., corn stover) typically is considered to include the corn stalks, leaves, husks and cobs remaining in the field after the corn grain (i.e., the kernels of grain) has been harvested. In accordance with traditional agricultural practices, many corn growers choose to leave above-ground corn residue on their fields for the purpose of maintaining soil fertility and organic content. Corn growers that also raise cattle often use corn residue as a feed source for the cattle. For example, the corn residue can be grazed as forage, or baled and used as fodder or bedding. Corn residue has also been considered for use in the production of cellulosic ethanol and has further been considered for use as a fuel source that can be co-fired with coal in coal fired burners where coal is the primary fuel.

SUMMARY

One aspect of the present disclosure relates generally to systems and methods for assisting high yield corn growers in their effort to effectively manage excess corn residue while concurrently generating power from the excess corn residue.

Another aspect of the present disclosure relates to systems and methods for effectively harvesting and baling corn residue, and for effectively using such harvested corn residue as a primary fuel source in a steam generation facility.

Examples representative of a variety of inventive aspects are set forth in the description that follows. The inventive aspects relate to individual features as well as combinations of features. It is to be understood that both the foregoing general description and the following detailed description merely provide examples of how the inventive aspects may be put into practice, and are not intended to limit the broad spirit and scope of the inventive aspects.

BRIEF DESCRIPTION OF THE DRAWINGS

FIG. 4 shows a first shredder/windrower in the process of performing a corn residue windrowing operation in accordance with the principles of the present disclosure;

DETAILED DESCRIPTION

Figure 1:
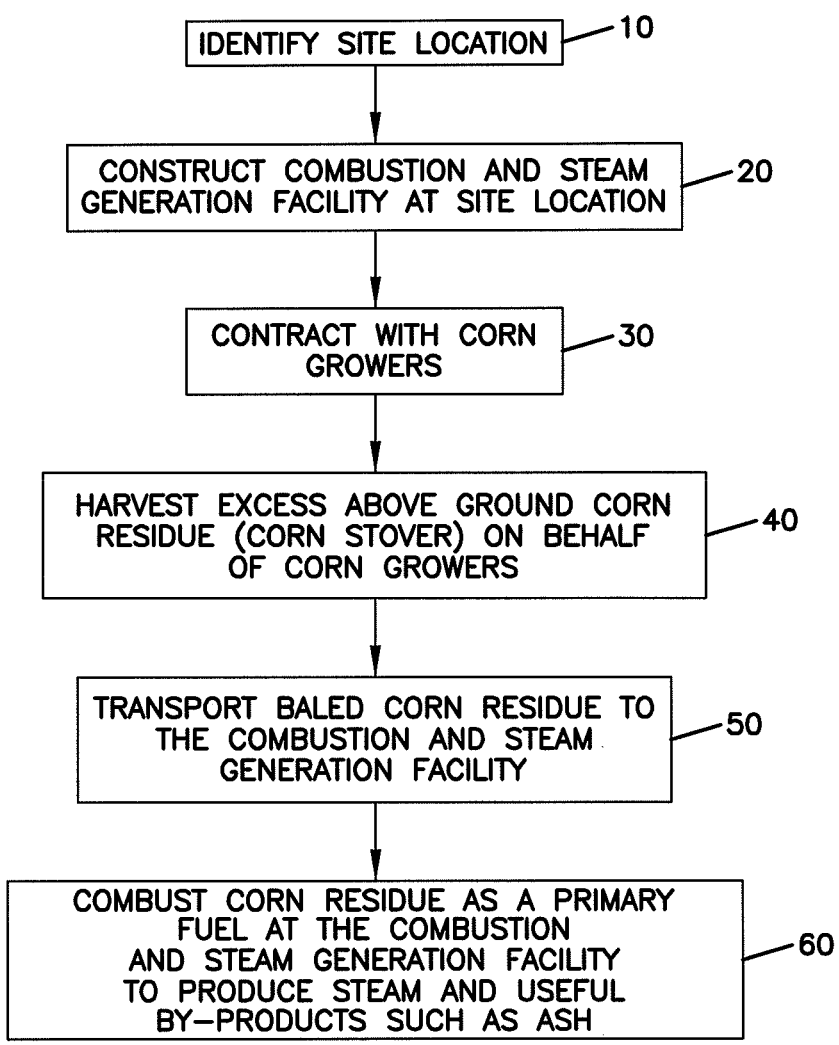
FIG. 1 is a flow chart illustrating a method for managing excess corn residue and for using the corn residue to generate steam in accordance with the principles of the present disclosure.

Traditionally, corn growers have managed their corn residue by tilling the corn residue into the soil after the grain has been harvested. Traditional wisdom teaches that tilling the corn residue back into the soil is necessary to maintain the nutrient value and organic content of the soil. Thus, it has generally been believed that tilling the corn residue back into the soil helps the soil support increased yields and reduces the amount of artificial fertilizers and soil conditioners that need to be applied to the fields.

The total biomass of a corn plant includes the corn grain, the above-ground corn residue, and the underground root system. Generally, the corn grain represents about one-third of the total biomass of a corn plant, the above-ground corn residue represents another one-third of the total biomass of the corn plant and the root system represents the final one-third of the total biomass of the corn plant. A bushel of corn grain can be assumed to weigh about 56 pounds. This being the case, for each bushel of corn grain, 56 pounds of above-ground corn residue is also produced.

Advancements in farming technology have resulted in significantly increased corn grain yields per acre. With ever increasing corn grain yields, the total amount of corn residue per acre has also increased. Increased levels of corn residue have presented problems for today's farmers. For example, high levels of corn residue can jam or clog tillage equipment thereby preventing the corn residue from being effectively plowed back into the field. Moreover, the soil cannot readily accept and decompose the large amounts of corn residue that results from today's increased corn yields. As a result, corn residue is not uniformly integrated and broken down into the soil which can result in slow or uneven field warming. Also, excessive amounts of corn residue in the soil can delay germination due to slower water absorption caused by inadequate soil to seed contact. Moreover, chemicals leaching from crop residue can delay early crop growth. The above problems associated with excessive corn residue can interfere with a corn grower's ability to maximize yields. Therefore, for high-yield corn crops, it is believed that removing a significant portion of the excess corn residue from the corn grower's fields will result in higher yields without negatively impacting the long term productivity of the soil. For example, research has shown that under certain conditions, removing about half of the above-ground corn residue from the field can provide as much as a 13 bushel per acre increase in the corn grain yield which also results in approximately an additional 728 pounds per acre of extra above-ground corn residue.

The present disclosure relates to methods and systems that can help corn growers effectively solve their excess corn residue problems while concurrently being compensated for their excess corn residue. The present disclosure also provides methods and systems that benefit the community at large by providing power from a bio-renewable fuel source while simultaneously creating local jobs.

Figure 2:
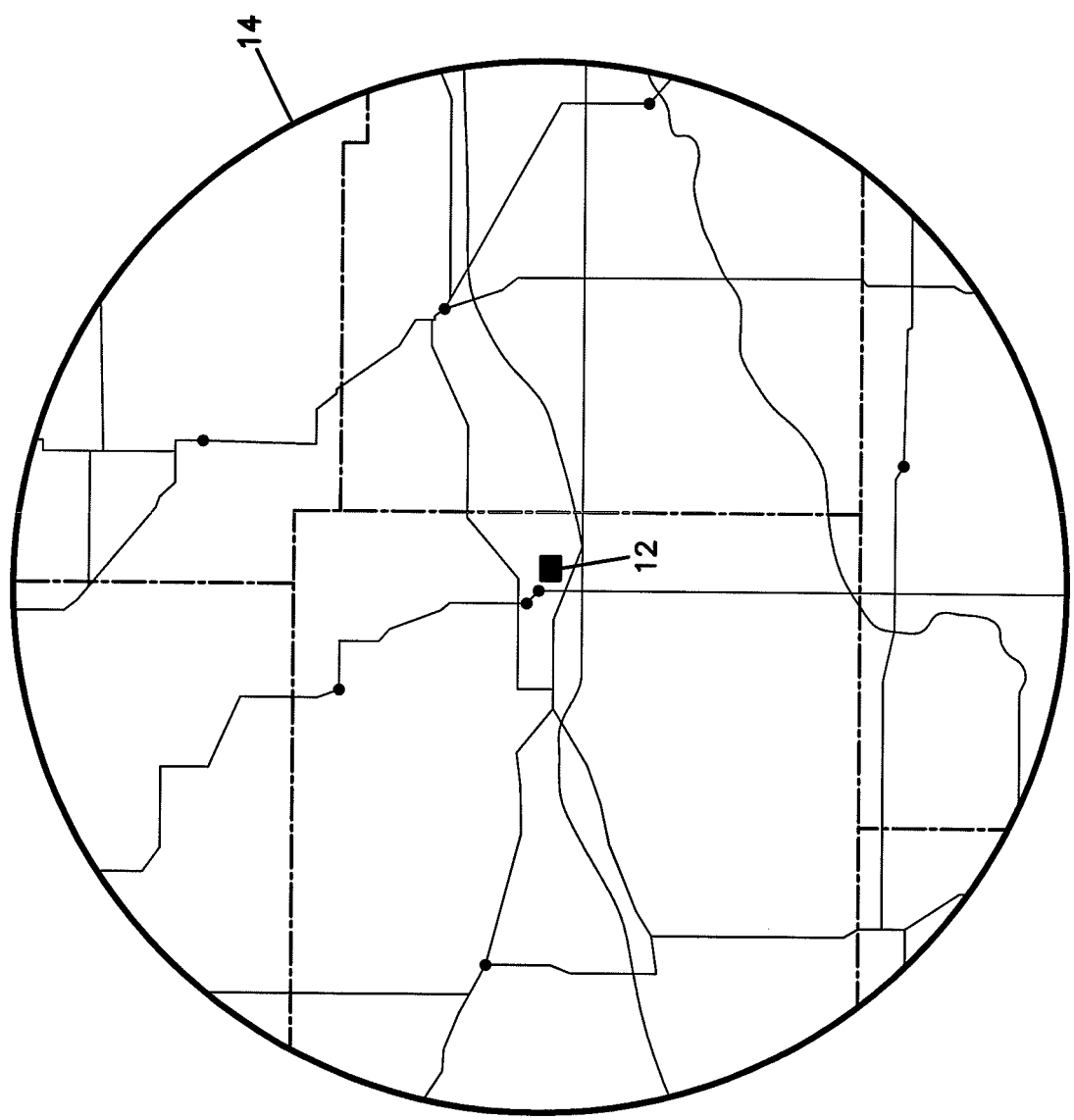
FIG. 2 shows an example site location for a corn residue combustion and steam generation facility in accordance with the principles of the present disclosure.

FIG. 1 is a flow chart illustrating a wide-scale method for managing and utilizing excess above-ground corn residue in accordance with the principles of the present disclosure. The method starts with a first step 10 where a particular facility site location is identified. A number of factors should be considered when identifying an appropriate site location. For example, a suitable site location should be in close proximity to a high density of high-yield, corn-on-corn acres. As used herein, the term "high-yield" corn acres means corn acres providing a grain yield of at least 180 bushels of corn grain per acre. Corn-on-corn acres are acres where corn is repeatedly planted in successive years. It is preferred for there to be at least 880,000 acres of high-yield, corn-on-corn acres within a service area of the selected site location. Referring to FIG. 2, a site location 12 is shown within a service area 14 having a 30 mile radius in which 880,000 acres of high-yield corn-on-corn acres are located. In a most preferred embodiment, the 880,000 acres of high-yield corn within the service area 14 provide an average grain yield of at least 190 bushels of corn grain per acre. It is believed that utilizing 50 percent of the above-ground corn residue present on 4 percent of the 880,000 acres of high yield corn within the service area will provide a source of biomass fuel that is sufficiently large to allow the facility to operate continuously for one year. This represents about at least 174,000 tons of corn residue based bio-fuel per year. By building the site location 12 in close proximity to a large amount of high-yield corn, the site location 12 is positioned in close proximity to a large source of bio-fuel in the form of excess corn residue. The close proximity of the bio-fuel allows bio-fuel transportation costs to be minimized thereby enhancing the cost effectiveness of the overall system.

It is also significant for the site location 12 to be in close proximity to a market having a stable demand for electricity. This generally means that the site location is relatively close to larger population centers which provide a stable demand for electricity thereby keeping the price of electricity stable. In certain embodiments, the site location 12 is chosen so that electricity generated at the site location 12 can be sold on the PJM market or a like market for electricity.

Once a site location has been identified, the second step 20 of the method of FIG. 1 includes constructing a combustion and steam generation facility 13 (see FIG. 3) at the site location 12 for pre-processing and combusting excess corn residue harvested/collected from the service area 14. The facility 13 can include a combustion and steam generation station 15. The combustion and steam generation station 15 can be referred to as a combustion and steam generation unit, island, arrangement, or like terms. The combustion and steam generation station 15 can include a furnace for combusting corn residue and a boiler that uses combustion heat from the furnace to generate steam. The facility can also include a steam turbine generator 17 (i.e., a steam turbine that cooperates with an electrical generator) to convert heat energy from the steam into electrical energy. Alternatively, the steam could be used for other applications. For example, the steam could be used in a cellulosic or grain ethanol production process or other processes using process steam.

It is preferred for the furnace of the combustion and steam generation station 15 to be configured to combust corn residue as a primary fuel. Of course, the furnace can include a source of supplemental heat such as natural gas burners that would typically be used at furnace start-up and shut-down operations. However, it is preferred for corn residue to be the primary (i.e., the main fuel) fuel burned in the furnace during normal operations between start-up and shut-down. In certain embodiments, corn stover is the only fuel burned in the furnace for certain periods of time. In other embodiments, a mixture including corn stover as a primary component and another fuel source (e.g., waste seed) as a secondary component can be burned in the furnace.

The facility 13 further can further include a pre-processing station 19 including a storage lay-out for providing storage of some of the harvested corn residue on site. In certain embodiments, the storage lay-out can include a short-term staging area 21 within a pre-processing building for holding the corn residue immediately before pre-processing, and an outside back-up storage area 23 for storing a back-up supply of corn residue (e.g., a one week supply of corn residue which typically would constitute at least 3400 bales that each weigh 1250 pounds). The back-up supply ensures that the facility 13 can continue to operate for a predetermined period of time in the event that weather or other factors interfere with the continuous supply of corn residue to the facility. The pre-processing station 19 can include processing equipment 27 within the pre-processing building for pre-processing (e.g., shredding) the corn residue prior to combustion.

Figure 3:
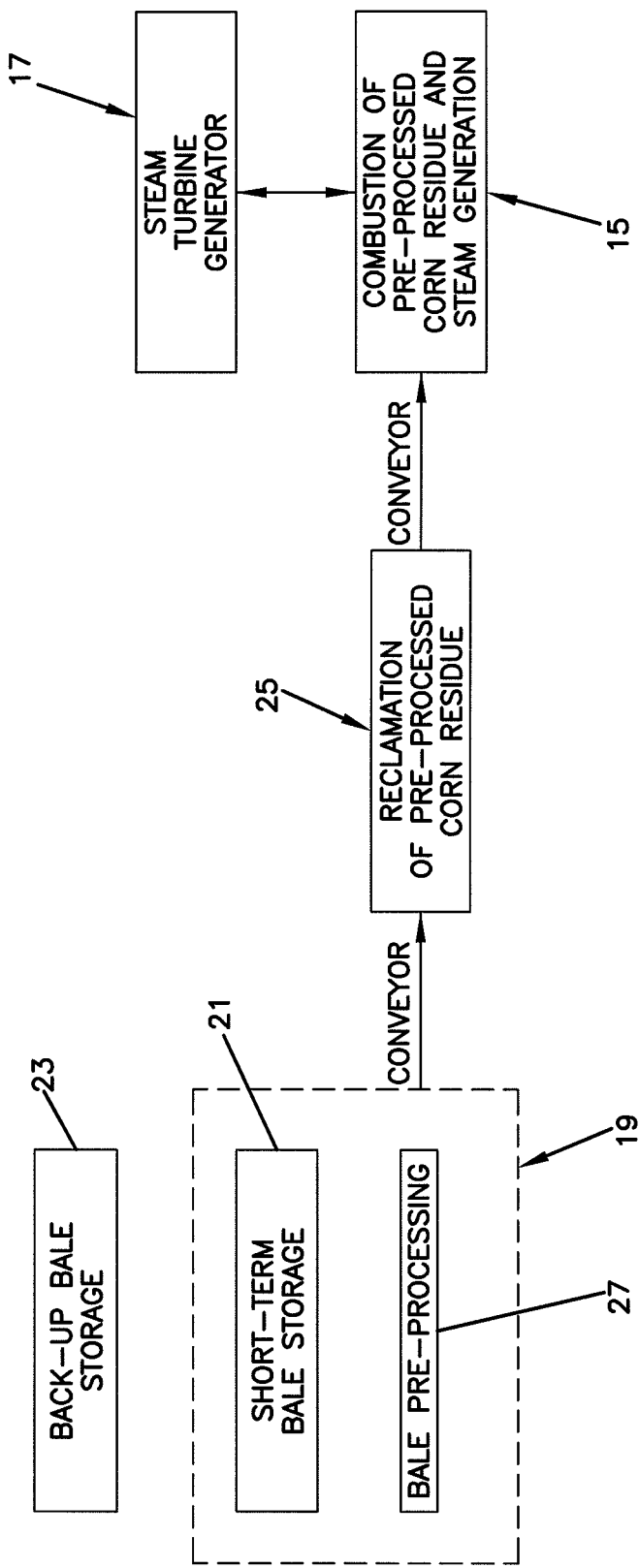
FIG. 3 is a diagrammatic plan view of a site layout for a corn residue combustion and steam generation facility in accordance with the principles of the present disclosure.

Referring still to FIG. 3, the facility 13 can include a reclamation station 25 that provides a buffer between the pre-processing station 19 and the combustion and steam generation station 15 for staging the pre-processed corn residue in an enclosed space for a limited time prior to feeding the pre-processed corn residue into the furnace of the combustion and steam generation station 15. The reclamation station 25 allows the pre-processing station 19 to be operated for set durations of time per day (e.g., 8-10 hours) while the combustion and steam generation station 15 is operated continuously. When the pre-processing station is operated, the rate at which the pre-processed corn residue is produced exceeds the rate at which the combustion and steam generation station 15 consumes the corn residue. Thus, the excess pre-processed corn residue generated by the pre-processing station 19 is stock-piled at the reclamation station 25. The amount of corn residue stock-piled at the reclamation station 25 is sufficient for the combustion and steam generation station 15 to operate continuously over the time period in which the pre-processing station 19 is shutdown.

The facility 13 preferably further includes pollution abatement equipment. For example, the facility 13 can include equipment (e.g., mechanical filters, mechanical separators such as cyclonic separators, precipitators, or other structures) for removing particulate material such as fly ash from the exhaust stream generated by the facility. The facility can also include a selective non-catalytic reduction (SNCR) system to reduce the concentration of nitrogen oxides ($NO_x$) in the exhaust emissions. Further, the facility can also include an acid gas control system for neutralizing acid gases present in the exhaust emissions.

Referring back to FIG. 1, the third step 30 of the depicted method involves contracting with corn growers in the service area 14 to harvest excess corn residue on their behalf. Typically, the facility operator will enter into multi-year contracts (e.g., three year, five year, etc.) with the corn growers with regard to harvesting of the excess above-ground corn residue. The amount of corn residue harvested may vary from corn grower to corn grower. For example, some corn growers may contract to have all of the corn residue on a given acreage harvested and removed from the field by the facility operator. However, many of the corn growers in the service area may elect to have only a portion of their corn residue harvested and removed from the field. The amount of corn residue that can be harvested is typically dependent upon the yield of the corn crop at issue. For high-yield corn acreages having a yield equal to 180 bushels per acre or more, it is preferred for the contract to specify that at least 50% of the above-ground corn residue can be harvested by the facility operator. In typical applications, 40% to 60% of the corn residue can be sustainably harvested without reducing soil productivity. This being the case, depending upon the yields of the corn crop at issue, the amount of corn residue contracted to be harvested could typically be in the range of 2.25-2.5 tons per acre.

It will be appreciated that the time period for harvesting the corn residue is rather short and limited generally to one to two months. This being the case, it is preferred for the contract to require the corn grower to notify the facility operator when the corn grower intends to harvest the grain and when the grower has actually harvested the grain. Also, the contract can require the corn grower to provide the facility operator with information relating to the corn crop (e.g., current moisture content of the corn grain, current moisture content of the corn stover). The above information allows the facility operator to efficiently plan when the above-ground corn residue can be harvested. The contract may also require the corn grower to make available a predetermined amount of the corn grower's acreage for storage of the harvested corn residue by the facility operator. The time period specified for storage of the harvested corn residue on the corn grower's property may range from 1 to 12 months.

At the fourth step 40 of the method of FIG. 1, the facility operator harvests the excess corn residue on the corn grower's behalf. It is preferred for the corn residue to have a moisture content in the range of about 10-15 percent at the time the corn residue is harvested. The moisture content of the corn residue affects the efficiency at which the corn residue is combusted. If the corn residue is too moist, the British Thermal Unit (BTU) value of the corn residue drops. In contrast, energy transfer rates reduce if the corn residue is too dry. Therefore, it is often desirable for the excess corn residue to remain in the field for a predetermined amount of time after the grain has been harvested before the excess corn residue is harvested. In this way, the excess corn residue is allowed to dry to the desired level in the field due to the effects of wind, sun, and low relative humidity. Once the corn residue reaches the desired moisture content, the corn residue is harvested.

The initial moisture content data provided to the facilitator operator by the corn grower at the time the grain is harvested can provide a rough estimate as to how long the excess corn residue should remain drying in the field prior to being harvested. Moisture testing can be conducted to anticipate/predict the appropriate time at which the corn residue can be harvested. The corn residue can be tested for moisture content by inserting moisture testing probes at a plurality of locations along the lengths of a plurality of stalks, and then averaging the results. Alternatively, a number of pieces of residue (e.g., stalk, leaves, cobs) can be reduced in size (e.g., shredded) and placed in a pile, and the moisture testing probes can be used to determine the moisture content at different locations within the pile. The different moisture readings taken for the pile can be averaged to determine the overall moisture content of the corn residue.

It will be appreciated that a significant amount of harvesting will need to be completed by the facility operator in a relatively short amount of time. To accomplish this harvesting, harvesting equipment, (e.g., shredders, windrowers, balers, accumulators) can be short term leased by the facility operator. Also, third parties can be hired as independent contractors working under the supervision of the facility operator for conducting the corn residue harvesting operations.

Once the corn residue in the contracted corn grower's field dries to the desired moisture content, the corn residue can be harvested by the facility operator. At shown at FIG. 4, the harvesting process can utilize a shredder/windrower 250 pulled by a tractor 252. The shredder/windrower 250 has a main housing 251 having a length that extends between first and second ends 247, 249. The shredder/windrower 250 defines a centerline 257 that bisects the housing 251 and is perpendicular to the length of the housing 251. The centerline 257 extends generally along a direction of travel of the shredder/windrower 250. The shredder/windrower 250 has a discharge chute 253 positioned at the first end 247 of the housing 251. The end positioning of the chute 253 allows two passes across a given field to be piled into a single windrow 255 (i.e., a combined windrow). The shredder/windrower 250 can include a cutting mechanism such as cup cutters 256 (i.e., cup knives) mounted on a rotating carrier 258 such as a drum or shaft rotatable about an axis of rotation 260. The cutting mechanism is mounted within the housing 251. The shredder/windrower 250 can also include a cross-conveyor such as a cross auger 262 mounted within the housing 251 for conveying corn residue cut by the cup cutters 256 laterally along the length of the housing 251 to the end discharge chute 253. One or more paddles 255 can be mounted on the carrier 258 for discharging the corn residue rearwardly out the discharge chute 253. The shredding/windrowing operation preferably is undertaken when the moisture content of the corn residue is in the range 10-15 percent.

For baling purposes, it is desirable for the combined windrow to have a width w less than about 42 inches and a fairly constant/uniform height across the width of the combined windrow. To achieve such a combined windrow, it is desirable for the corn residue collected from the second pass across the field to be piled at least partially on top of the windrow from the first pass. Preferably, this is accomplished without riding over a portion of the first windrow which can cause balling and overall disruption of the windrow. To allow the second windrow to be piled over the first windrow, it is desirable for the discharge chute 253 to be adjustable to cause the corn residue to be discharged at least partially in a lateral direction outwardly from the first end 247 of the housing 251. In certain embodiments, the first windrow can be deposited directly behind the shredder/windrower and the second windrow can be discharged from the chute in a direction extending at least partially laterally outwardly from one end of the shredder/windrower so that the second windrow can be piled at least partially over the first windrow.

Figure 4A:
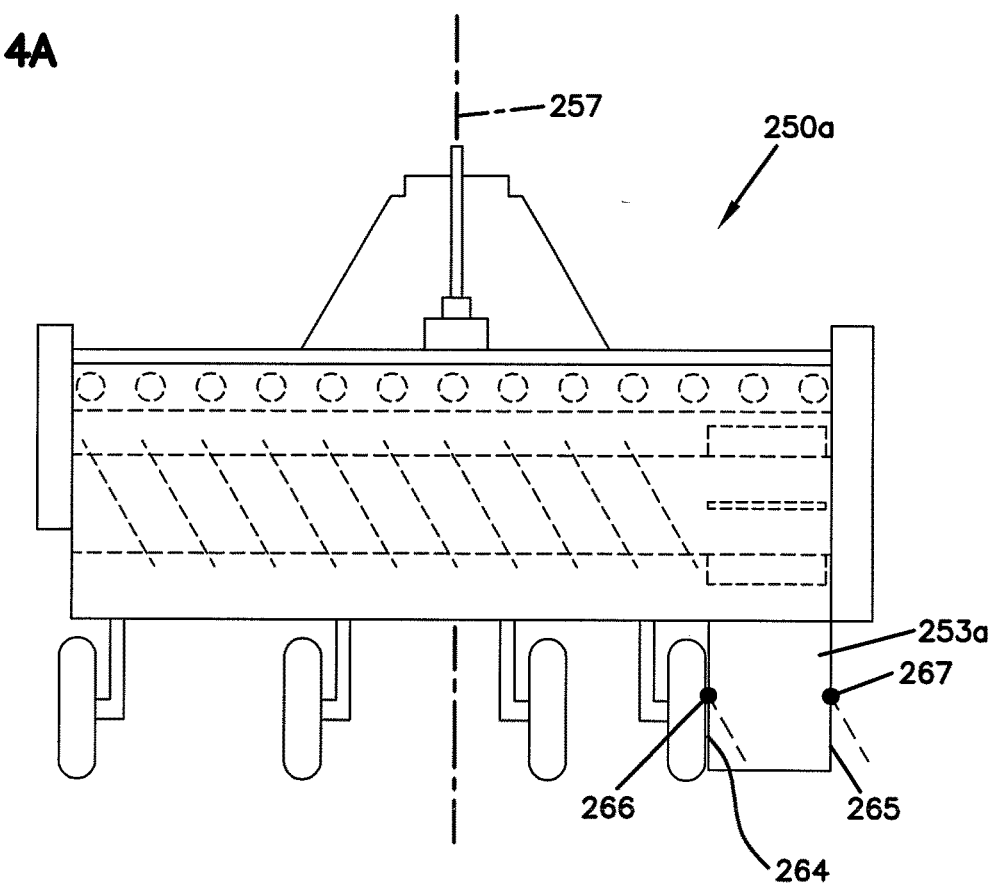
FIG. 4A shows a second shredder/windrower suitable for windrowing corn residue in accordance with the principles of the present disclosure.

FIGS. 4A-4D show various configurations for adjusting the discharge stream directed from a shredder/windrower. FIG. 4A shows a shredder/windrower 250a having a discharge chute 253a including inner and outer guides 264, 265 that can be pivoted about vertical axes 266, 267 relative to respective inner and outer walls 268, 269 of the chute 253a. Once pivoted to a desired position, the guides 264, 265 can be secured in place (e.g., with fasteners, clamps, etc.). The guides 264, 265 can be oriented parallel to the centerline 257 or angled relative to the centerline 257. When the guides 264, 265 are angled away from the centerline 257, material discharged from the chute 253a moves in a direction angled laterally outwardly away from the centerline 257.

Figure 4B:
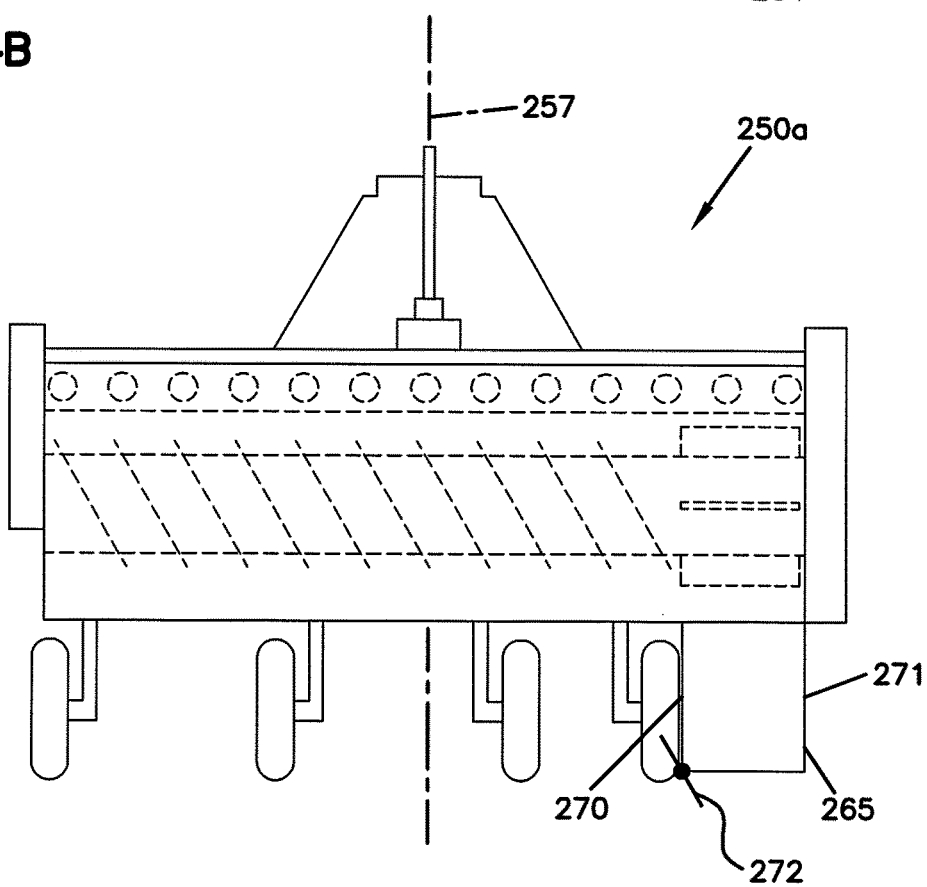
FIG. 4B shows a third shredder/windrower suitable for windrowing corn residue in accordance with the principles of the present disclosure.

FIG. 4B shows a shredder/windrower 250b having a discharge chute 253b including inner and outer walls 270, 271. A guide 272 is pivotally attached to the inner wall 270. The guide 272 can be angled relative to the centerline 257 so that material discharged from the chute 253b moves in a direction angled outwardly away from the centerline 257. The guide 272 can also be oriented so that the chute 253b discharges material in a rearward direction parallel to the centerline 157.

Figure 4C:
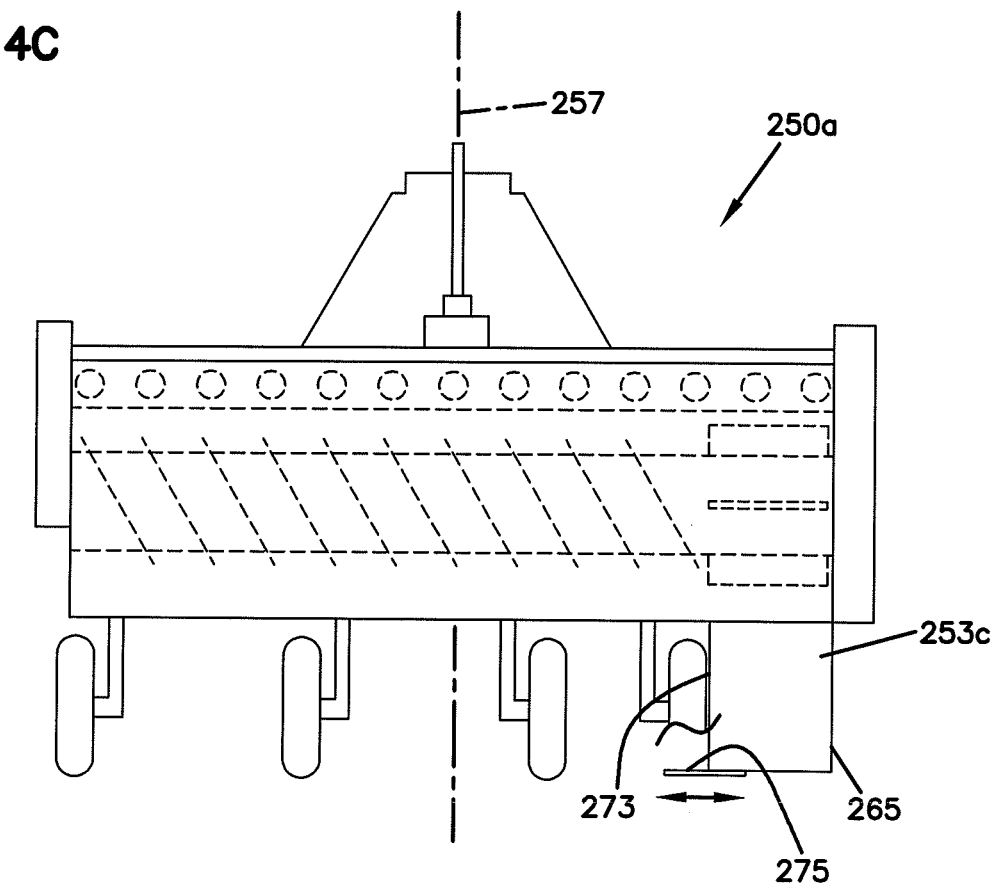
FIG. 4C shows a fourth shredder/windrower suitable for windrowing corn residue in accordance with the principles of the present disclosure.

FIG. 4C shows a shredder/windrower 250c having a discharge chute 253c including inner and outer walls 273, 274. A blocking plate 275 is slidably attached to the inner wall 273. The blocking plate 275 can slide along a slide orientation that is transverse relative to the centerline 257 to vary the discharge area of the chute 253c. By moving the blocking plate 275 away from the centerline 257 along the slide orientation and securing the blocking plate 275 in place, the discharge area of the chute 153c is made narrower. Also, because the adjustment is made at the inner wall 273 as compared to the outer wall 274, the outside edge of the windrow formed from the chute 253c is moved away from the centerline 257. The smaller width of the chute 253c opening combined with the positioning of the outer wall 274 of the chute opening 253c in close proximity to the outer end of the shredder/windrower 250c assists in making a narrower combined windrow because two relatively narrow windrows can be deposited side-by-side with minimal gaps thereinbetween.

Figure 4D:
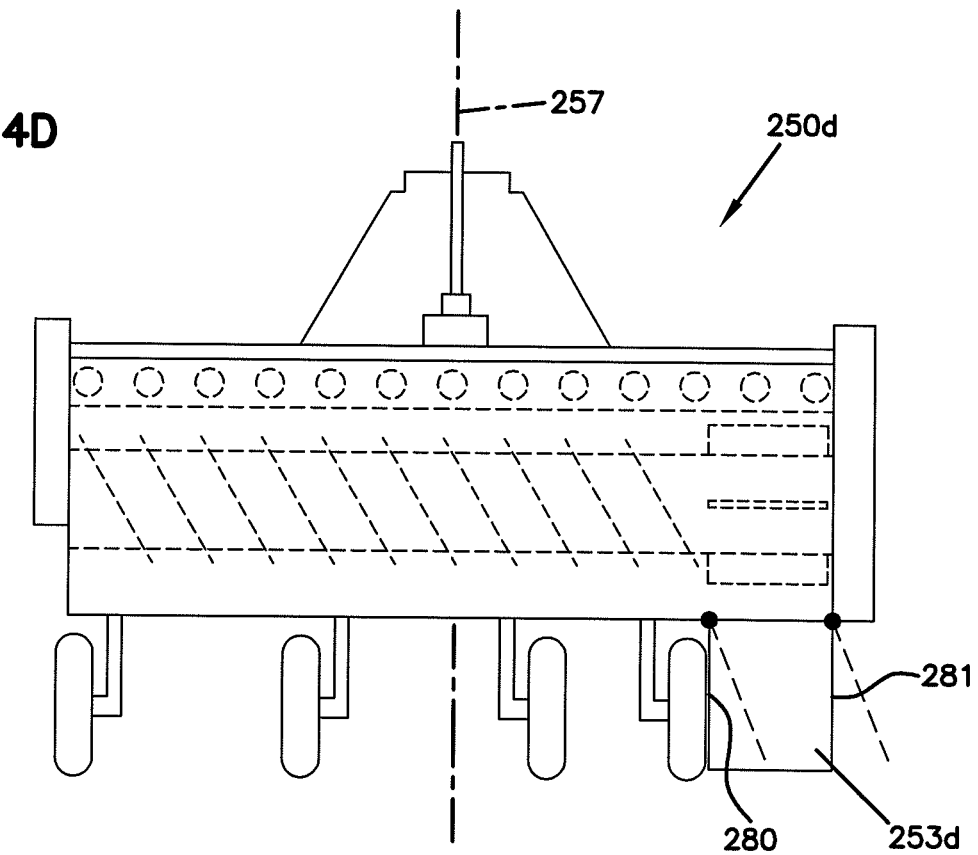
FIG. 4D shows a fifth shredder/windrower suitable for windrowing corn residue in accordance with the principles of the present disclosure.

FIG. 4D shows a shredder/windrower 250d having a discharge chute 253d including inner and outer walls 280, 281. One or both of the walls 280, 281 can be moved relative to the main housing of the shredder/windrower 150d to control a direction in which the corn stover is discharged form the chute 250d. By moving the walls 280, 281 about vertical pivot axes, the walls 280, 281 can be moved to orientations angled toward the centerline 257, parallel to the centerline 257 or away from the centerline 257.

It is desirable for the shredding/windrowing operation to be controlled such that the amount of corn residue harvested from a given acreage corresponds to the contracted amount. To control the amount of residue harvested, the shredder/windrower 250 can be set at different cutting heights, with lower cutting heights corresponding to more tons of corn residue harvested per acre and higher cutting heights corresponding to fewer tons of corn residue harvested per acre. In certain embodiments, the cutting heights can range from 2 inches to 20 inches. In preferred embodiments, the cutting heights are in the range of 8 to 15 inches or 6-12 inches.

During the harvesting process, it is desirable to minimize the dirt and other debris present in the windrows. Corn growers prefer as much soil as possible to remain in their fields. Also, increased soil content in the harvested corn residue can dilute the value of the fertilizer that results as a by-product from processing the corn residue. Further, the weight attributable to excess dirt in the corn residue increases transportations costs. Moreover, excess dirt in the corn residue can make bales made from the corn residue more difficult to handle with equipment such as accumulators since the bales tend to slide less easily.

During windrowing, the rotation of the cup cutters 256 creates a vacuum effect that assists in drawing corn residue and also dirt up into the windrower 250. In this regard, the amount of dirt collected is dependent upon the height the corn residue is cut during windrowing/shredding. Higher cuts result in less dirt in the windrowed corn residue while lower cuts result in more dirt in the windrowed corn residue. The amount of dirt in the windrowed corn residue can also be controlled by varying a tilt angle of a tow bar of the windrower 250.

The amount of vacuum generated by the cup cutters 256 is directly dependent upon the speed at which the cup cutters 256 are rotated about the axis 260. It is therefore desirable to control the rotational speed of the cup cutters so that corn residue is effectively carried to the horizontal conveyor without also carrying excessive amounts of dirt/soil. Typically, a tractor power take-off operates at a rotational speed ranging between about 900-1100 rotations-per-minute (RPM) and the power input shaft of the windrower 250 is driven by the power take-off at a 1-to-1 ratio. The power input shaft of the windrower drives rotation of the rotating carrier 258. Under conditions where excessive dirt collection is an issue (e.g., low cuts, dry conditions), the operator can operate the tractor so as to minimize the rotational speed of the power take-off. For example, the tractor can be operated such that the power take-off speed is less than 1000 RPM or less than 950 RPM. By lowering the power take-off speed, the rotational speed of the cup cutters 256 is lowered thereby lowering the vacuum effect of the cup cutters 256

In certain embodiments, a rotation speed adjustment mechanism (e.g., a gear box or variable speed transmission) can be used to allow the rotational speed of the rotating carrier 158 to be adjusted to match a given application. The rotation speed adjustment mechanism can be provided at some point between the power take-off and the rotating carrier 158 or can be provided at the tractor to adjust the rotation speed of the power take-off. In this way, when it is desirable to provide a low cut in dry conditions, the rotation speed adjustment mechanism can be used to lower the rotational speed of the rotating carrier 158 to a desired level. Also, for high cut applications, the rotation speed adjustment mechanism can be used to increase the rotational speed of the rotating carrier 158 to a desired level which may allow the tractor to be operated at higher ground speeds.

It is desirable for the shredder/windrower 250 to shred the corn residue to an average length having a target range of 3-12 inches. In certain embodiments, the corn residue output from the windrower 150 to the windrow 255 has been shredded to an average length having a target range of 6-9 inches. Shredding the corn residue to a desired length assists in subsequently producing bales having a desired size and degree of compaction.

Figure 5:
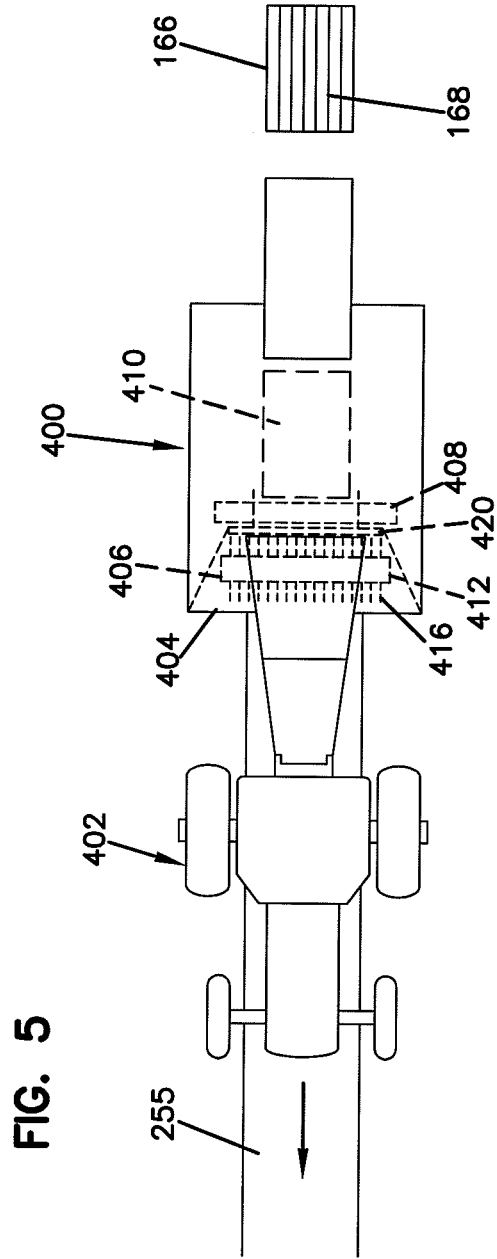
FIG. 5 shows a baler in the process of conducting a corn residue baling operating in accordance with the principles of the present disclosure.

After the shredding and windrowing operation has been completed, the corn residue in the windrows 255 is preferably baled (see FIG. 5). In the baling operation, it is preferred to create rectangular bales 166 so as to facilitate handling and stacking. In preferred embodiments, the bales can be about 3 feet by 4 feet by 8 feet. To encourage water shedding and to minimize handling and transportation costs, it is preferred for the bales 166 to be relatively dense. In a preferred embodiment, the bales 166 have a compacted density of at least 13 pounds per cubic foot. In certain embodiments, the bales 166 can have a weight in the range of 1,000-1,500 pounds, or a weight in the range of 1,100-1,400 pounds, or a weight of about 1,200 to 1,300 pounds. The above weights and compaction rates are applicable for bales formed by corn residue having a moisture content of about 10 percent. In one embodiment, the bales 166 are held together by at least six wraps of plastic twine 168 having a tensile strength of at least 450 pounds. In other embodiments, other sized rectangular bales (e.g., 4×4×8 foot) or even round bales could be used.

FIG. 5 shows a baler 400 being pulled behind a tractor 402 along one of the windrows 255. As shown at FIG. 5, the baler 400 has compacted a portion of a windrow into a plurality of bales 166. The baler includes a throat 404 that is preferably wider than the windrow 255. A rotatable pick-up mechanism 406 is positioned in the throat 404 for picking up the corn residue and carrying the corn residue to a set of screw conveyors 408 which move the corn residue into a central compaction chamber 410. In the compaction chamber 410, the corn residue is compacted into a rectangular bale and then wrapped with twine. The finished bale 166 is discharged out a back of the baler 400.

Figure 5A:
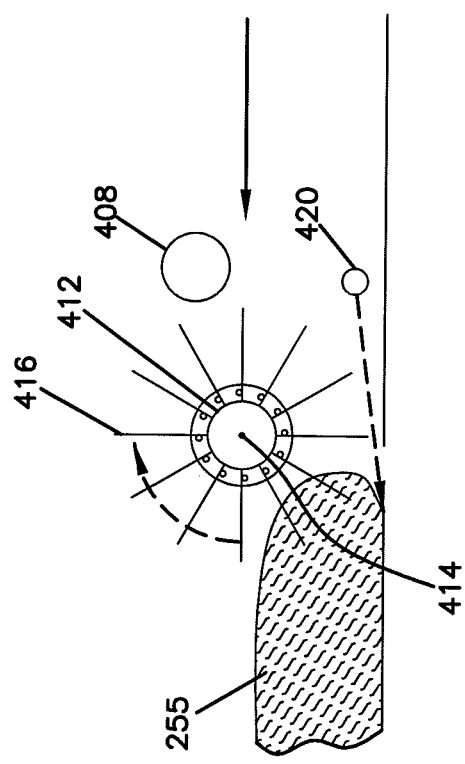
FIG. 5A is a side view of a portion of the baler of FIG. 5.

Referring to FIGS. 5 and 5A, the rotatable pick-up mechanism 406 includes a shaft 412 that is rotated about a central axis 414. A plurality of radial tines 416 (e.g., fingers, wires, members, etc.) are carried by the shaft 412 about the central axis 414 as the shaft 412 is rotated. The tines 416 are rotated in a direction which causes the corn residue to be picked-up by the tines 416 and carried over the top of the shaft 412 to the screw conveyors 408. Positioning the pick-up mechanism 406 too close to the ground can lead to tine breakage. However, when the pick-up mechanism 406 is elevated, the pick-up mechanism 402 is unable to pick-up a lowermost layer of the corn residue. Leaving a sizable layer of corn residue in the windrow can be problematic for corn growers practicing no-till farming since the layer can interfere with effective seed planting and germination. Also, leaving corn residue in the windrows reduces the overall corn residue harvest. To overcome this problem, the baler 400 can include an air assist system 420 for assisting the pick-up mechanism 406 in picking up the bottom layer of corn residue in a windrow. The air assist system 420 can include an air directing arrangement (e.g., one or more air knives, air nozzles, etc.) that directs a stream or streams of air under the pick-up mechanism 406 thereby causing the bottommost layer of corn residue in the windrow to be lifted up by the air into the path of the rotating tines 416 of the pick-up mechanism 406. In this way, the pick-up mechanism 406 can be positioned elevated above the ground while still being able to pick up the bottommost layer of corn residue in the windrow 255.

After the baling process has been completed, the bales are collected and stacked at a temporary storage location on the corn grower's field. The space corresponding to the temporary storage location may be leased from the corn grower for a specified time period as part of the contract with the corn grower.

Figure 6:
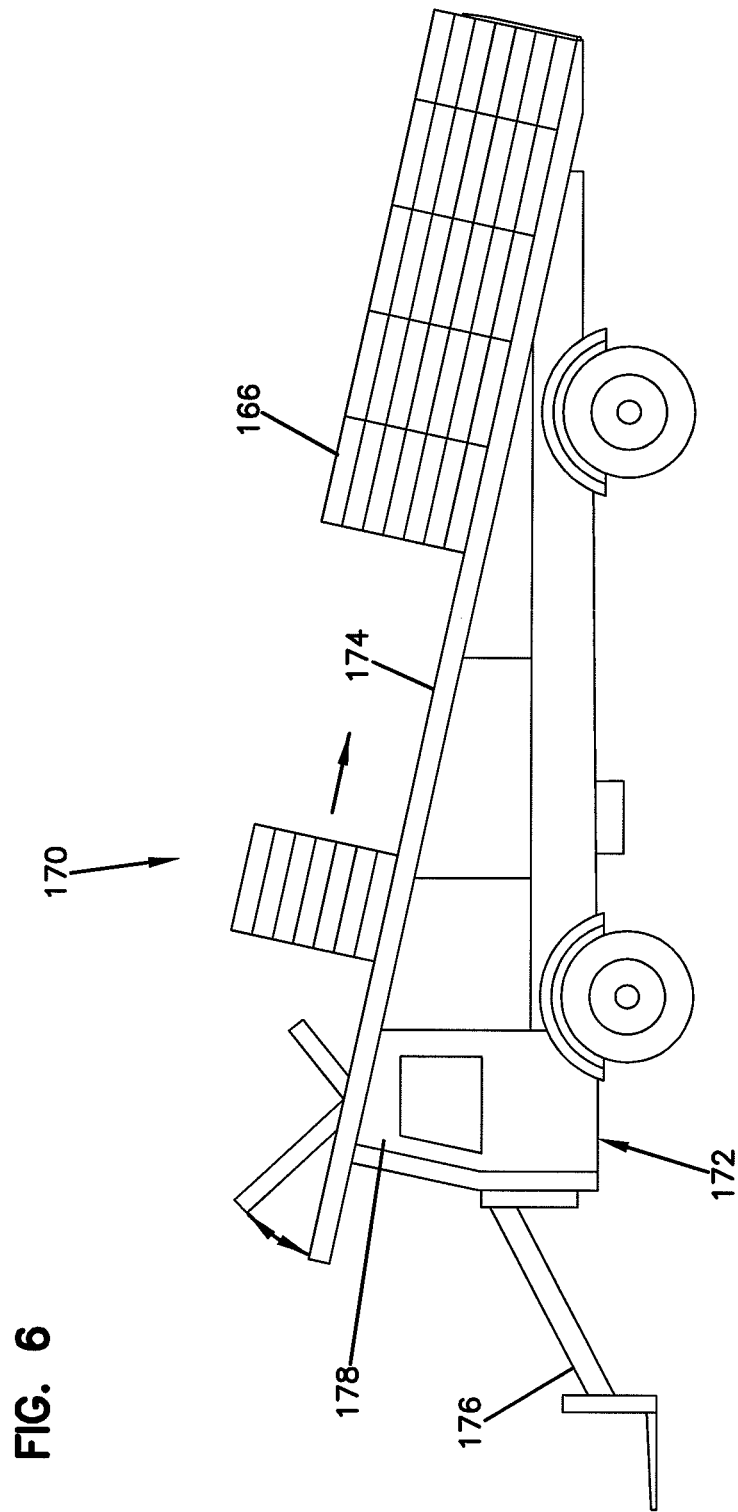
FIG. 6 shows an accumulator for collecting bales from a field.

The bales can be collected and stacked using an accumulator device. FIG. 6 shows an example accumulator 170 including a vehicle 172 supporting an angled bed 174 and a front lift mechanism 176. In use of the accumulator 170, the accumulator 170 is driven across the field and the front lift mechanism 176 is used to lift bales over the top of a cab 178 of the vehicle onto the angled bed 174. To pick up a given bale, it is not necessary to stop movement of the vehicle. Instead, the bale is picked up on the fly and lifted over the cab 178 to the angled bed 174. The bale then slides down the angled bed to a stop to provide room for additional bales. Once a predetermined number of bales has been accumulated on the bed 174, the accumulator 170 returns to the temporary storage location on the corn grower's field where the bales are slid off of the angled bed 174 to the storage location and stacked at the storage location.

At the fifth step 50 of the method of FIG. 1, the bales are transported from the temporary storage locations on the corn grower's fields to the combustion and steam generation facility. Preferably, the bales remain stored on the corn grower's fields until the bales are needed for combustion at the facility 13. Thus, the bales can be transported from the corn grower's fields and immediately/directly delivered to the pre-processing station 19 for pre-processing without any intermediate off-site storage of the bales. In this way, the amount of time and energy spent in handling and transporting the bales is minimized. In cases where storage on the corn grower's field is not an option, the bales can be transported to an off-site storage location where the bales are temporarily stored until the bales are needed for combustion at the facility site.

Figure 7:
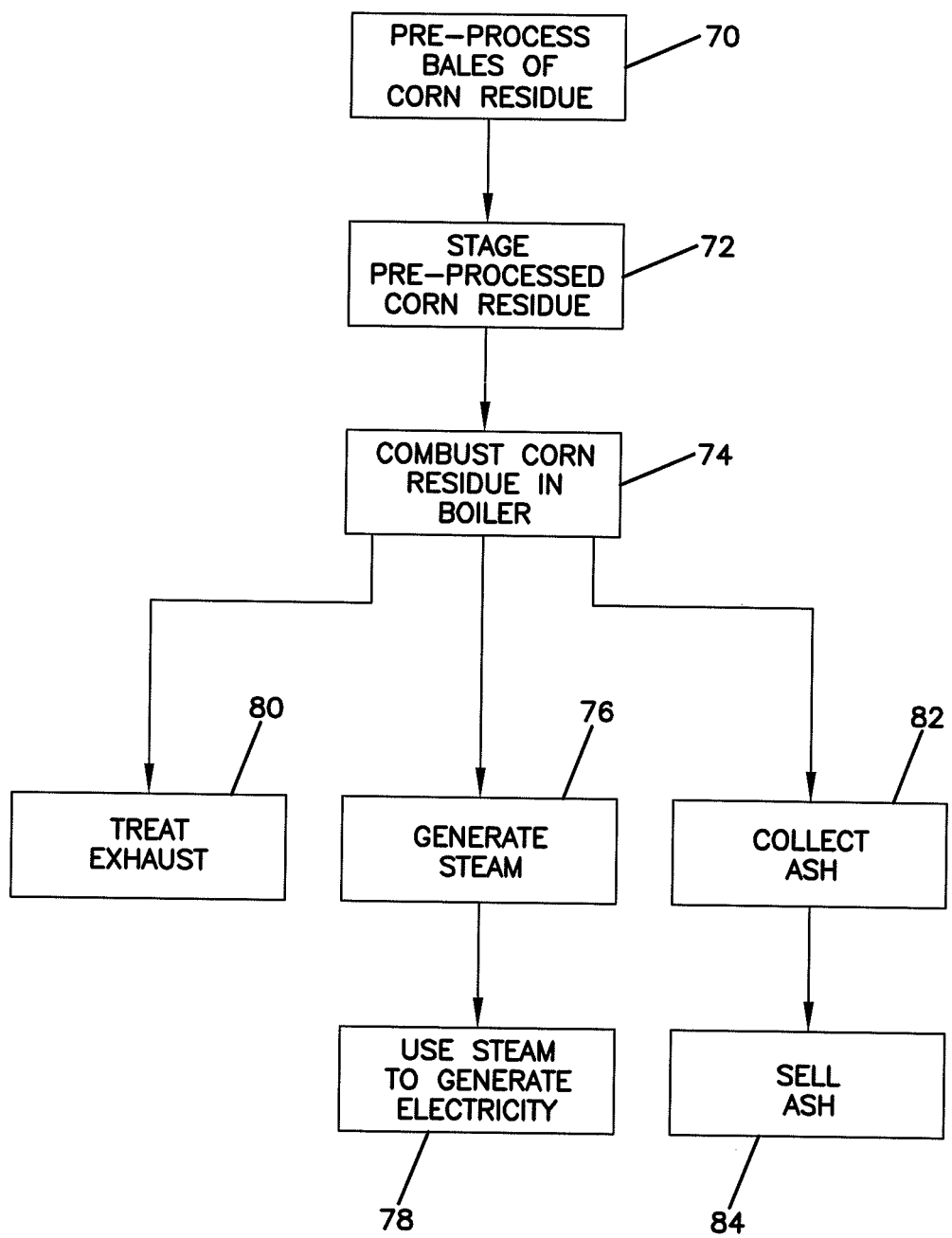
FIG. 7 is a flow chart showing a method for utilizing corn residue in accordance with the principles of the present disclosure.

At the sixth step 60 of the method of FIG. 1, the baled corn residue at the combustion and steam generation facility 13 is processed to produce power and useful by-products such as ash. FIG. 7 is an outline that provides an overview of the sequence of operations that are conducted at the facility 13. At step 70, the bales are pre-processed (e.g., reduced such as by shredding) at the pre-processing station 19. After being pre-processed at the pre-processing station 19, the pre-processed corn residue is conveyed to the reclamation station 25 (see step 72) where the pre-processed corn residue is piled in a stock-pile. Thereafter, the pre-processed corn residue is conveyed from the reclamation station 19 to the combustion and steam generation station 15 and is combusted (see step 74). The heat from the combustion of the pre-processed corn residue is used to produce steam (see step 76) which is used to generate electricity (see step 78). A combustion exhaust stream resulting from combustion of the corn residue is treated by pollution abatement equipment (see step 80) prior to being discharged to atmosphere. Fly ash in the exhaust stream is collected (see step 82) and sold (see step 84).

Figure 8:
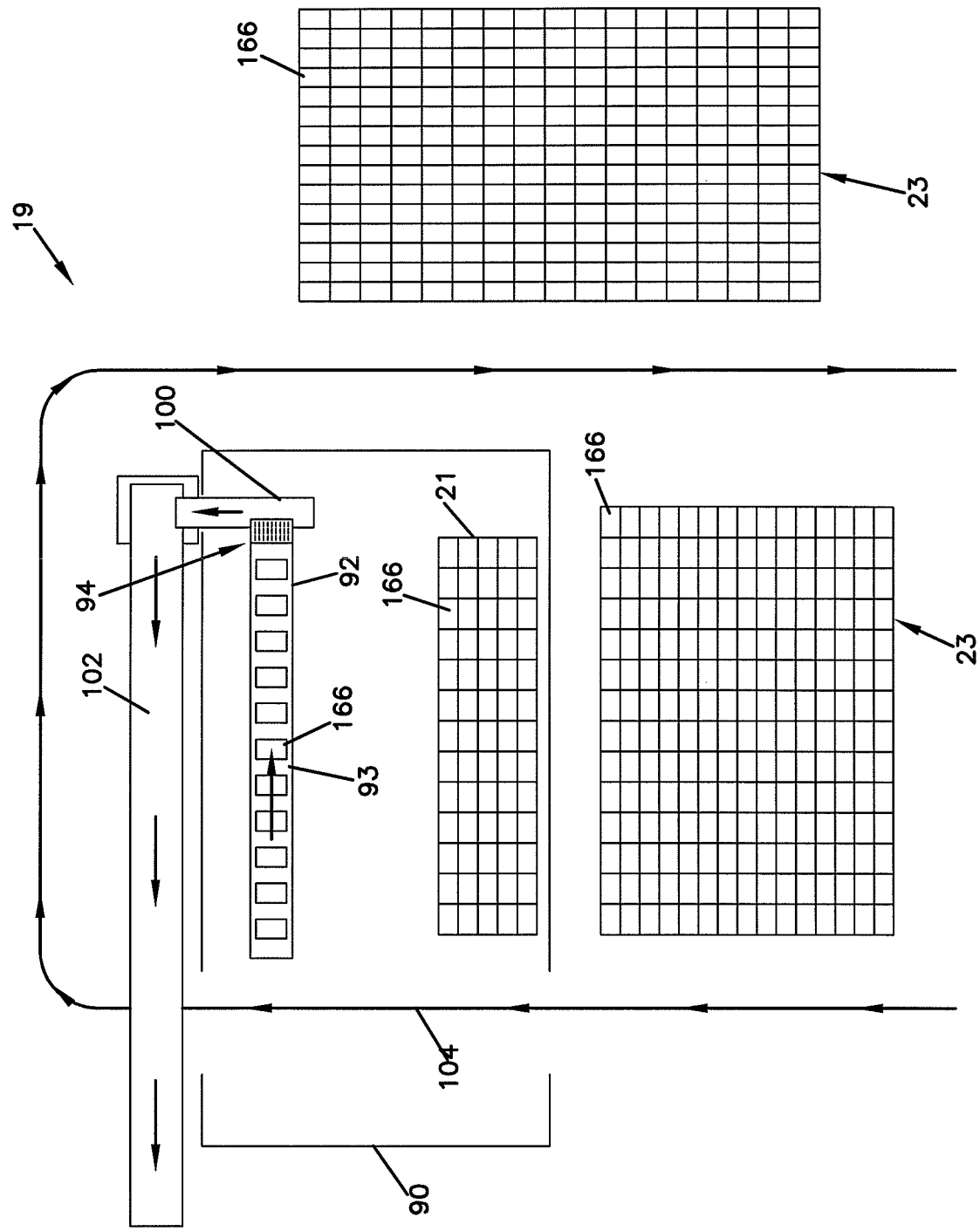
FIG. 8 is a diagrammatic plan view of a pre-processing station of the site layout of FIG. 3.
Figure 9:
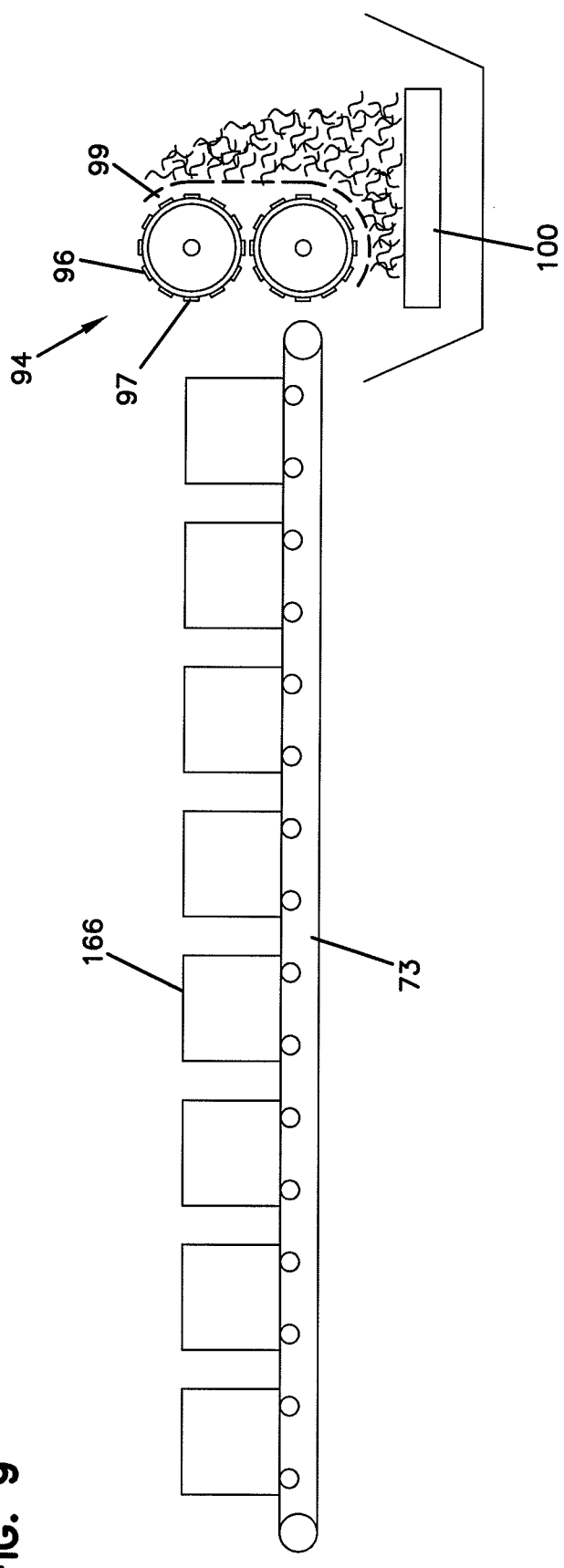
FIG. 9 is a diagrammatic side view of a material reducing machine housed at the pre-processing station of FIG. 8.

FIGS. 8 and 9 show the pre-processing station 19 of FIG. 3 in more detail. The pre-processing station 19 includes a pre-processing building 90 housing one or more reducing machines 92 and the short-term staging area 21. The short-term staging area 21 generally provides enough space to store 250-350 bales each weighing about 1250 pounds. The reducing machine 92 includes an in-feed conveyor 93 that feeds the bales into a reducing assembly 94. The reducing assembly includes one or more rotatable reducing units 96 (e.g., drums, rotors, shafts) that carry a plurality reducing elements 97 (e.g., teeth, blades, flails, etc.) for breaking apart the bales and for reducing the average size of the corn residue components forming the bales. A screen 99 can be provided for controlling the size of the pieces of corn residue that exit the material reducing machine 92. The screen 99 at least partially surrounds the rotatable reducing units 96 and forms a reducing chamber in which the rotatable reducing units 99 are positioned. In one embodiment, the reducing machine 92 grinds the corn residue forming the bales such that the pieces of corn residue exiting the material reducing machine 92 have an average length less than 3 inches. It is also preferred for the corn residue exiting the grinders to have no more than 25 percent material that is less than 0.25 inches in length. The material reducing machine 92 deposits the reduced corn residue on a discharge conveyor 100 that carries the reduced corn residue to an elevated conveyor 102. The elevated conveyor 102 carries the reduced corn residue from the pre-processing building 90 to the reclamation station 25.

Referring to FIG. 8, the pre-processing station 19 includes a truck routing path 104 that extends through the building 90 so that trucks carrying bales from the corn grower's fields can unload the bales directly onto the in-feed conveyor 93 or into the short-term staging area 21 in the event the in-feed conveyor 93 is full. The truck-routing path has a straight pass-through configuration through the building 90. A truck scale can be provided at the pre-processing station 19 for determining the weight of each truck's load before the bales are unloaded. The weights can be used to determine how much each corn grower should be compensated pursuant to the contract with the facility operator.

The back-up storage area 23 of the pre-processing station 19 is divided between two dedicated areas immediately outside the building 90. As described above, the corn residue is preferably continuously supplied to the pre-processing station 19 during operation of the pre-processing station 19 by delivering the baled corn residue to the pre-processing station 19 directly from the storage locations on the individual corn grower's fields. Therefore, it is anticipated that poor weather conditions or extremely wet fields may limit access to the corn residue on the corn grower's fields for periods of time. To address this issue, the back-up storage area 23 provides enough on-site storage of corn residue to allow the facility to continue to operate over the worst-case anticipated period of time (e.g., 1 week) in which the field stored corn residue can not be accessed.

As described previously, the reclamation station 25 provides an enclosed location for stockpiling the reduced corn residue that is ultimately fed to the combustion and steam generation station 15. In one embodiment, the reclamation station 25 is configured to stage (e.g., stockpile, store, accumulate) at least 1000 tons of reduced corn residue.

Figure 10:
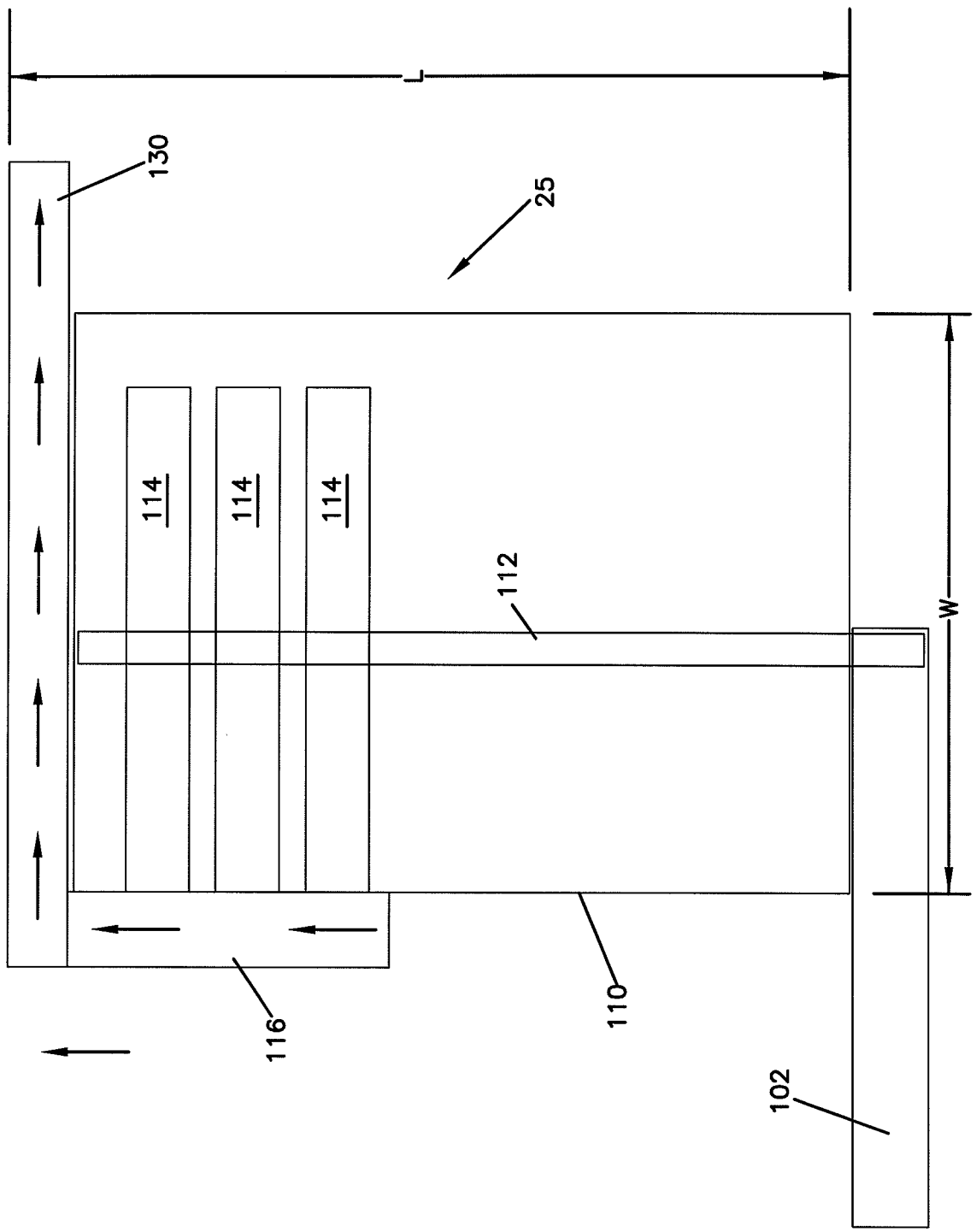
FIG. 10 is a diagrammatic plan view of a reclamation station of the site layout of FIG. 3.
Figure 11:
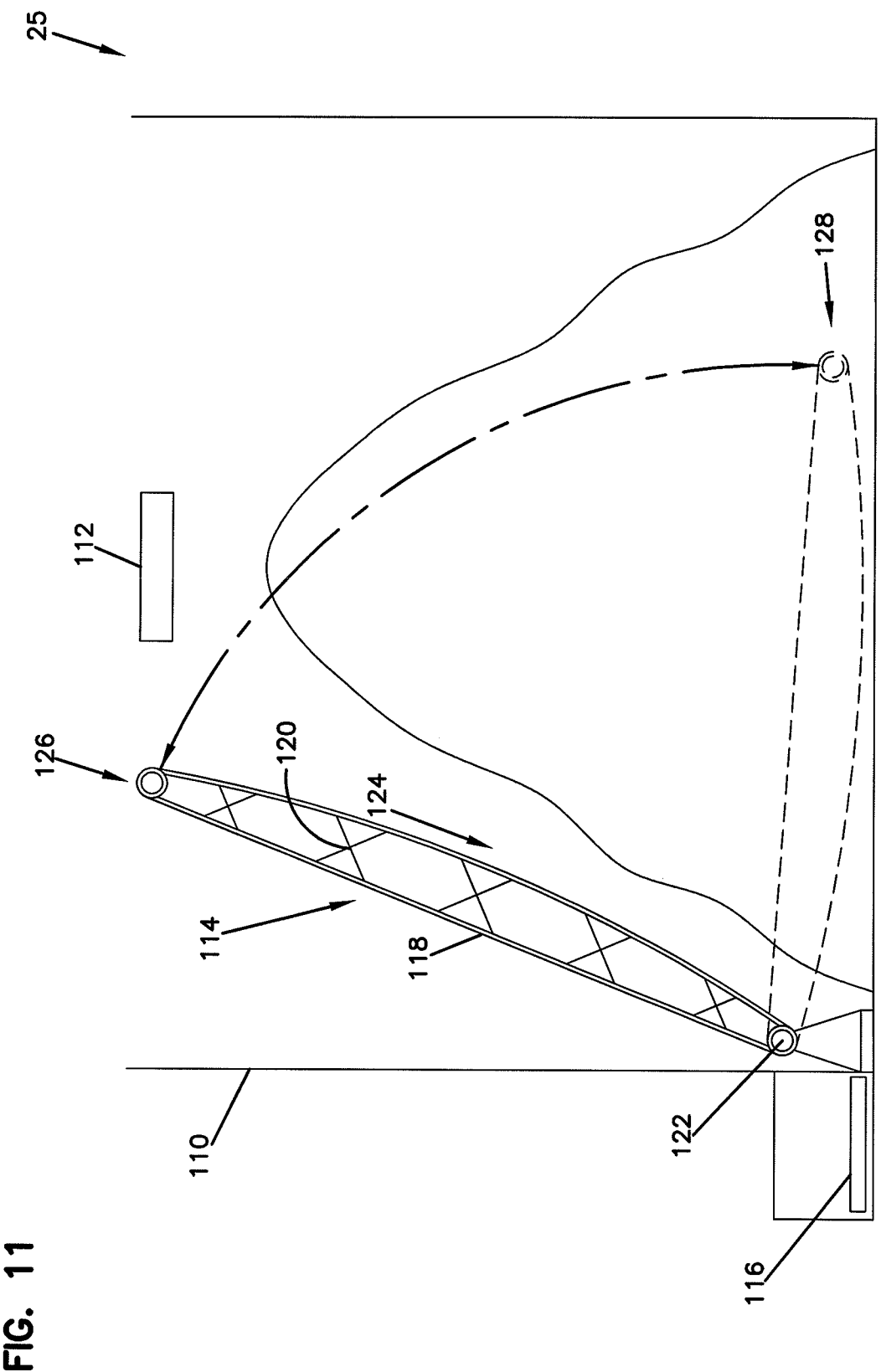
FIG. 11 is a diagrammatic side view of the reclamation station of FIG. 10.

FIGS. 10 and 11 show the reclamation station 25 of FIG. 3 in more detail. Referring to FIG. 10, the reclamation station 25 includes a storage building 110 having a length L and a width W. An elevated in-feed conveyor 112 extends along the length L of the reclamation building 110 along the ceiling of the reclamation building 110. The in-feed conveyor 112 receives the reduced corn residue from the elevated conveyor 102 that extends between the pre-processing station 19 and the reclamation station 25. The in-feed conveyor 112 is used to fill the reclamation storage building 110 along its length. Over-the-pile reclaimers 114 are located at one end of the building 110. The reclaimers 114 are used to move the reduced corn residue stored within the reclamation storage building 110 to an out-feed conveyor 116. The out-feed conveyor 116 carries the reduced corn residue to a conveyor 130 that extends from the reclamation station 25 to the combustion and steam generation station 15. As shown at FIG. 11, each reclaimer 114 includes a conveying structure 118 (e.g., a drag chain or belt) oriented in a continuous loop about a reclaimer boom 120 that pivots about a pivot axis 122. Each conveying structure 118 is rotated in a direction of rotation 124 about its corresponding reclaimer boom 120. The reclaimer booms 120 are movable about the pivot axes 122 between raised, upwardly angled positions 126, and lowered positions 128 (see in dashed line).

In use, the reclaimers 114 are initially positioned in the raised positions 126 above a pile of reduced corn residue stored within the storage building 110. To unload stored reduced corn residue from the storage building 110, the reclaimers 114 are pivoted downwardly from the raised position while the conveying structures 118 are rotated in the direction of rotation 124. As the reclaimers 114 are moved downwardly, the conveying structures 118 engage the pile of corn residue and drag the corn residue down the pile laterally along the width W of the building 110 to the out-feed conveyor 116. Once the reclaimers 114 reach the lower positions 128 such that all of the corn residue previously stored thereinbeneath has been loaded onto the out-feed-conveyor 116, the reclaimers 114 are raised back to the raised position 126 and corn residue piled at the opposite end of the building is pushed along the length L of the pre-processing building 210 to the area beneath the reclaimers 114. In certain embodiments, equipment such as a front end loader is used to push the corn residue beneath the claim conveyors 218. Thereafter, the reclaimers 114 can again be pivoted from the raised position 126 to the lowered position 128 to unload the corn residue pushed beneath the reclaimers 114.

Figure 12:
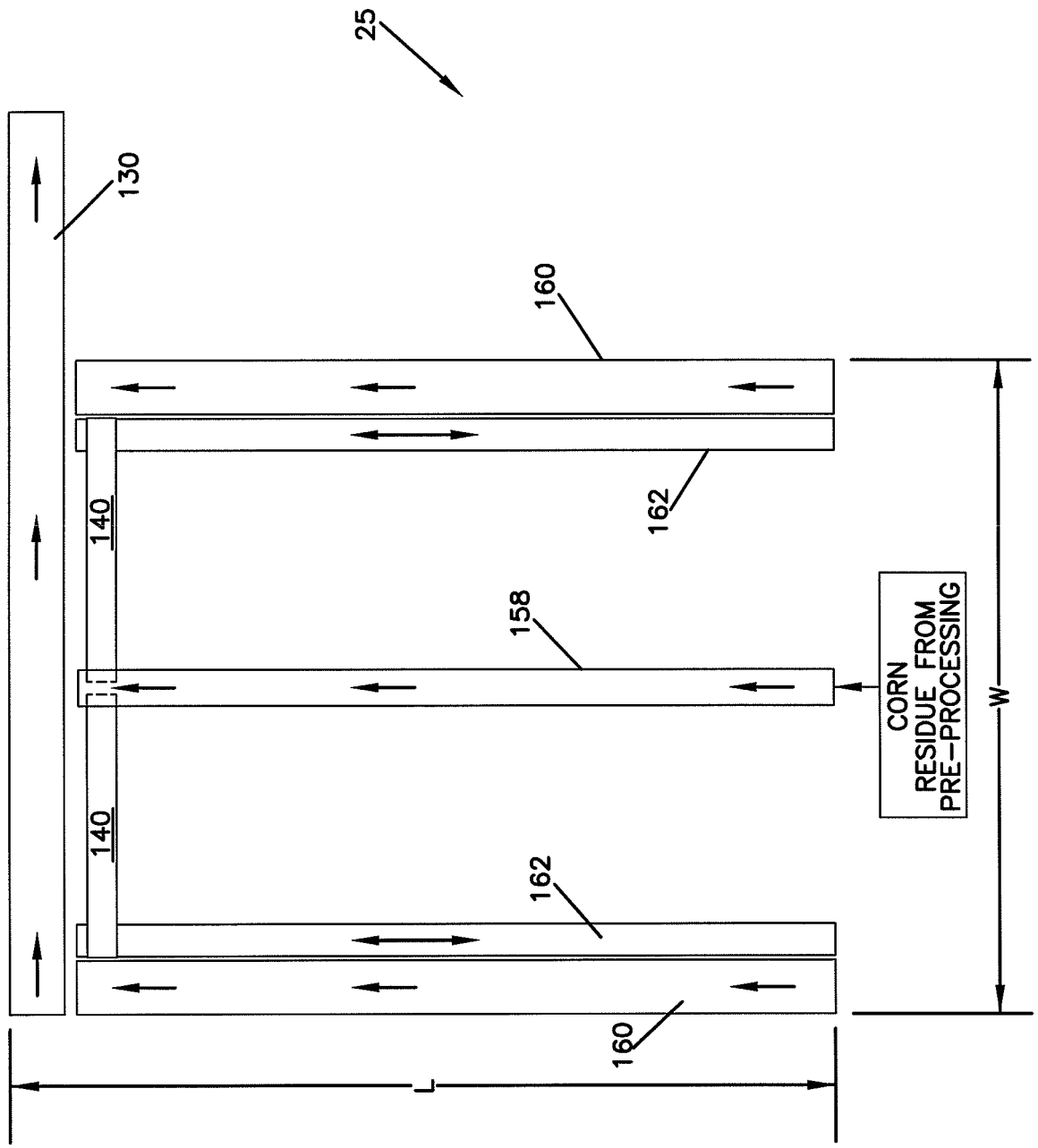
FIG. 12 is a diagrammatic plan view of an alternative configuration for the reclamation station of the site layout of FIG. 3.
Figure 13:
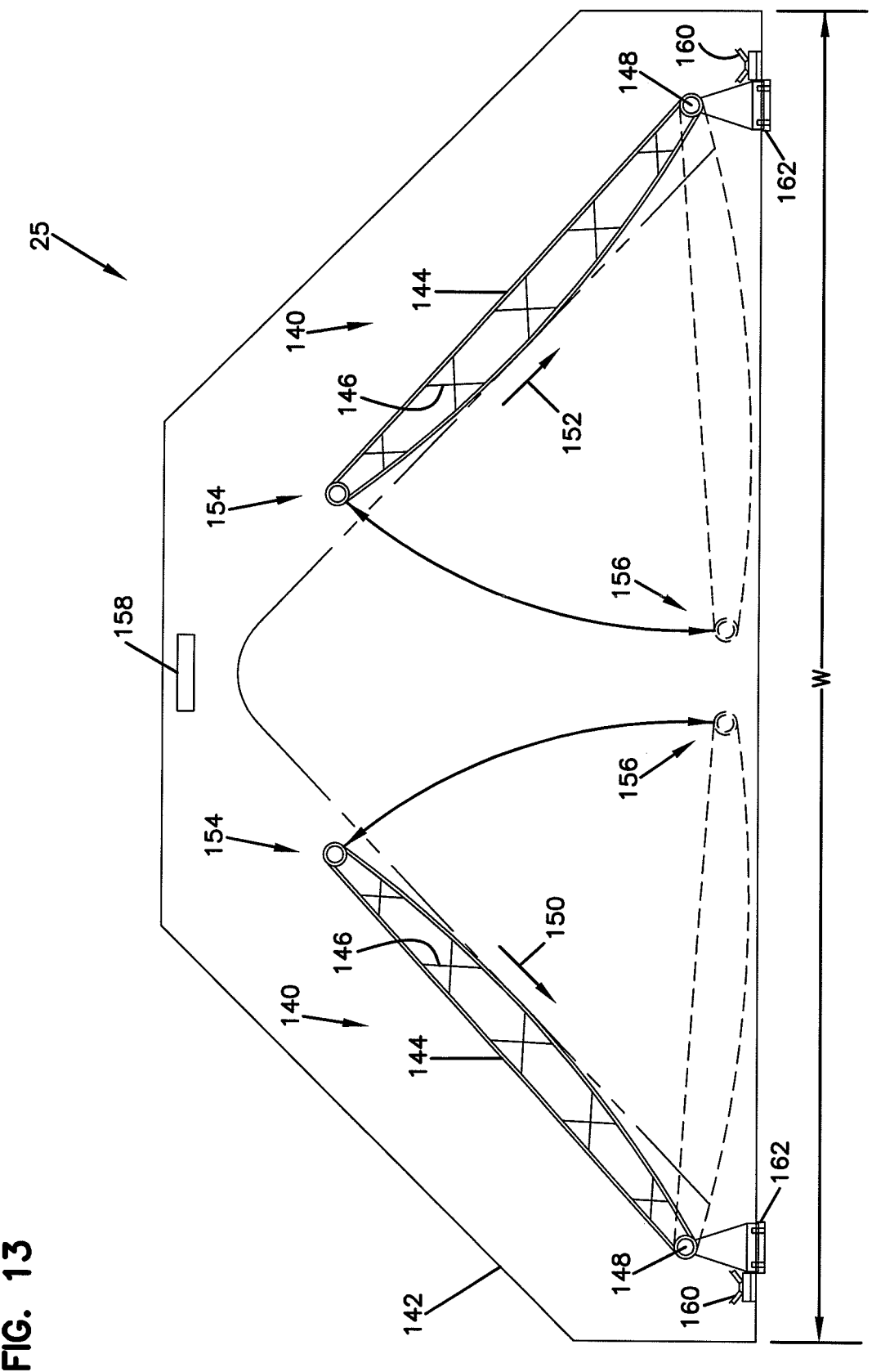
FIG. 13 is a diagrammatic side view of the reclamation station of FIG. 12.

FIGS. 12 and 13 show an alternative reclamation conveyor arrangement for the reclamation station 25. The alternative reclamation conveyor arrangement includes two over-the-pile reclaimers 140 that cooperate to extend across the width W of a reclamation storage building 142. The reclaimers 140 each include a continuous conveying structure 144 that loops about a boom 146 that pivots about an axis 148. The conveying structures 144 are rotated in directions 150, 152 about their corresponding booms 146. The reclaimers 140 pivot about the axes 148 between raised orientations 154 where the reclaimers 140 are angled upwardly and lowered orientations 156 where the reclaimers 140 are generally horizontal and adjacent to the floor of the building 142. An in-feed conveyor arrangement 158 extends along the length L of the building 142 and is mounted adjacent the top of the building 142. The in-feed conveyor arrangement 158 receives the reduced corn residue from the elevated conveyor 102 that extends between the pre-processing station 19 and the reclamation station 25. Out-feed conveyors 160 extend along the length L of the building 142 and are located adjacent the pivot axes 148 of the reclaimers 140. The out-feed conveyors 160 carry the reduced corn residue to a conveyor 130 that extends from the reclamation station 19 to the combustion and steam generation station 15. In certain embodiments, the reclaimers 140 can be mounted on a track 162 or other structure that allows the reclaimed conveyors to travel (e.g., to be indexed) along the length L of the building 142.

In operation of the reclamation building 142, the building 142 is initially filled with reduced corn residue via the elevated in-feed conveyor arrangement 158. To unload corn residue piled beneath the reclaimers 140, the reclaimers 140 are pivoted downwardly from the raised orientations 154 while the conveying structures 144 are rotated in directions 150, 152 about their respective booms 146. As the reclaimers 140 are lowered, the conveying structures 144 contact the corn residue piled beneath the reclaimers 140 causing corn residue to be dragged downwardly and laterally across the width of the building 142 toward the out-feed conveyors 160. As the reclaimers 140 are gradually moved downwardly, the material beneath the reclaimers 140 is conveyed to the out-feed conveyors 160 at the sides of the building 142. Once the reclaimers 140 reach the lower orientations 156, the reclaimers 140 are raised back to the raised orientations 154 and then are indexed or otherwise moved by a transport drive arrangement along the tracks 162 to a position where the reclaimers 140 are oriented above reduced corn residue that had been previously loaded into the building 142 by the in-feed conveyor arrangement 158. The reclaimers 140 are then lowered to move the next batch of reduced corn residue to the out-feed conveyors 160. It will be appreciated that the above indexing and unload sequence can be repeated to progressively move the reclaimers 140 along the entire length L of the reclamation building 142. In this way, the entire storage region of the building 142 can be unloaded without requiring movement of the stored corn residue within the building 142 by supplemental equipment such as a front end loader.

Figure 14:
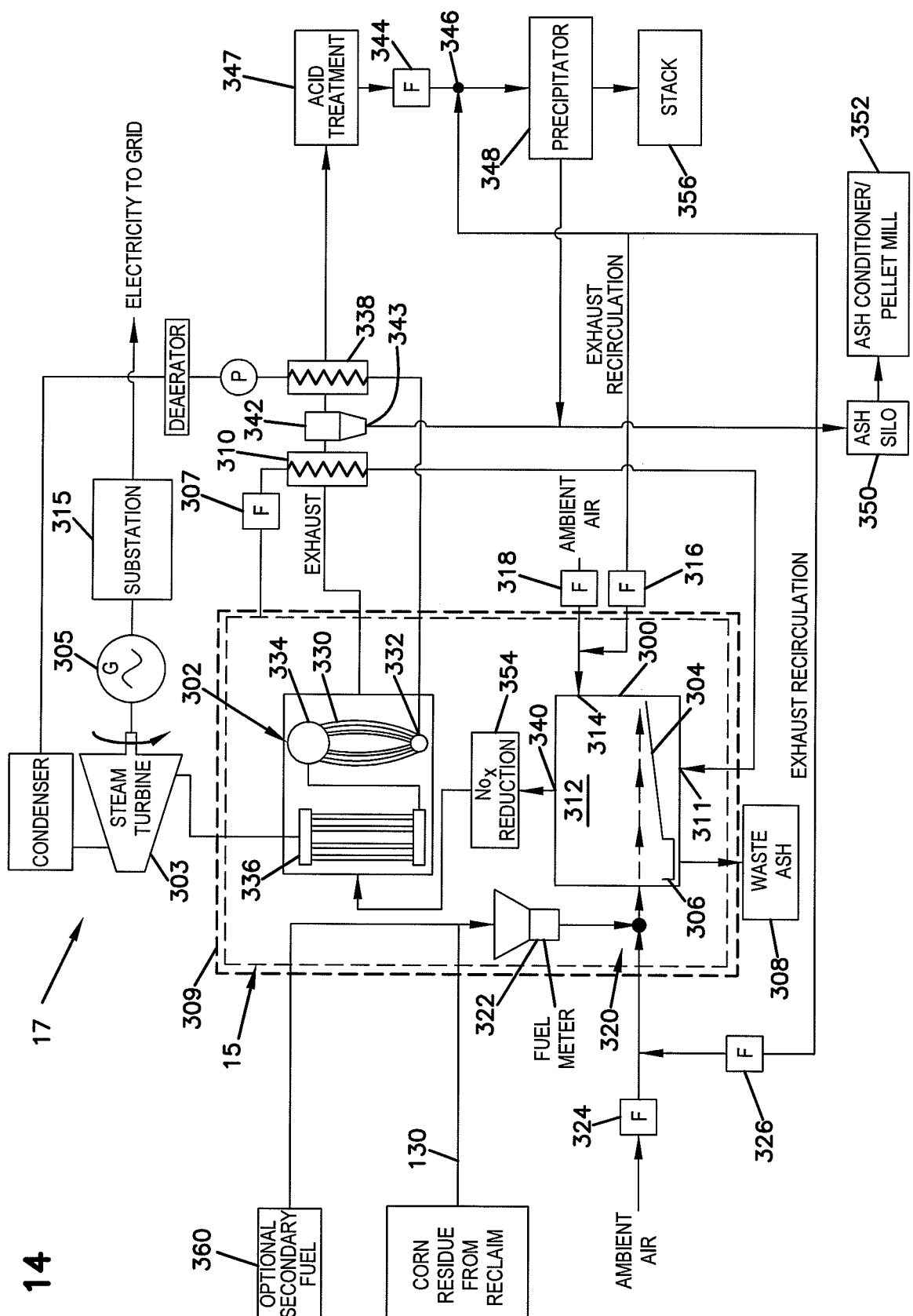
FIG. 14 is a schematic view of a combustion and steam generation station and an electricity generation station of the site layout of FIG. 3.

FIG. 14 shows the combustion and steam generation station 15 of FIG. 3 and the steam turbine generator 17 of FIG. 3 in more detail. The combustion and steam generation station 15 includes a furnace 300 where corn residue is combusted to produce combustion heat used for generating steam at a boiler 302. Steam from the boiler 302 drives a steam turbine 303 of the steam turbine generator 17. The turbine 303 powers an electrical generator 305 which produces electricity that can be sold. A substation 315 is used to step-up the voltage of the electricity generated by the generator 305 before the electricity is sold.

The furnace 300 of the combustion and steam generation station 15 can include a stoker including a vibrating grate 304 on which the corn residue desired to be combusted is distributed. Combustion air can be directed into the furnace 300 at a location 311 beneath the grate 304 such that the combustion air flows upwardly through the grate 304 during combustion of the corn residue. A fan 307 can be used to draw warmed combustion air from a building 309 housing the furnace 300 to utilize waste heat generated by the furnace 300. The combustion air can also be pre-heated by a heat exchanger 310 through which exhaust gas from the furnace 300 passes. The vibrating grate 304 of the stoker can be sloped and is vibrated for auto cleaning. Ash generated by the combustion of corn residue is discharged from a discharge end of the stoker grate 304 to an ash hopper 306. A conveyor discharges the ash from the hopper to a disposal container 308.

An upper combustion region/volume 312 is provided above the stoker grate 304 for combusting suspended fuel particles and combustible gases. Air/gas can be injected into the upper combustion region 312 at nozzles 314. The air/gas can be in the form of ambient air or re-circulated exhaust from the furnace 300 or combinations thereof. Fans 316, 318 can be used to move the ambient air and/or the re-circulated exhaust.

The corn residue can be delivered to the grate 304 by a fuel distribution system 320 that receives reduced corn residue from a fuel metering arrangement 322. The fuel metering arrangement 322 receives the corn residue from the conveyor 130 that extends from the reclamation station 25 to the combustion and steam generation station 15. The fuel metering arrangement feeds the corn residue down chutes to the fuel distribution system 320. The fuel distribution system 320 can include a pneumatic system that uses a stream of gas/air to carry/blow the corn residue across the top of the grate 304. The gas/air for the fuel distribution system 320 can be provided by a fuel distributor air fan 324 that delivers ambient air to the furnace 300, or by a flue gas recirculation fan 326 that re-circulates furnace exhaust gas back to the furnace 300. It will be appreciated that the air/gas sources can be used alone or in combination. The corn stover fuel fed into the furnace preferably is a mixture of corn stover pieces having a composition including an average piece length less than 3 inches with no more than 25 percent by weight being less than 0.25 inches in length. In one embodiment, the corn stover fuel fed into the furnace is a mixture of corn stover pieces having a composition including at least 75 percent by weight that is less than 3 inches in length and no more than 25 percent by weight that is less than 0.25 inches in length.

Injecting the re-circulated exhaust gas back into the furnace 300, as described above, can assist in controlling $NO_x$ emissions. The system can also include a $NO_x$ removal station 354 for treating the furnace exhaust. The $NO_x$ removal station can utilize anhydrous ammonia to reduce $NO_x$ to nitrogen and water.

The boiler 302 of the combustion and steam generation station 15 receives hot exhaust gas from the furnace 300 and uses heat from the furnace exhaust to generate steam. The boiler 302 includes a plurality of steam tubes 330 that extend from a mud drum 332 to a steam drum 334. Steam from the steam drum 334 is super heated at a superheater 336. Heat of combustion from the furnace 300 is utilized to evaporate water in the steam tubes 330 such that steam is provided to the steam drum 334, and is also used to superheat the steam in the superheater 336. As shown at FIG. 14, hot exhaust output from the furnace 300 flows into the boiler 300. In the boiler, the exhaust gas initially flows across the superheater 336 and then flows across the steam tubes 330. Superheated steam from the superheater 336 is conveyed to the steam turbine generator 17. Specifically, the superheated steam is directed to the steam turbine 303 which powers the electrical generator 305. After passing through the steam turbine 303, the steam is passed through a condenser (e.g., cooling towers) and then routed in a closed path back through a deaerator and a heat exchanger 338 to the mud drum 332. The heat exchanger 338 uses heat in the furnace exhaust gas exiting the boiler 302 to preheat the feed water before the feed water enters the mud drum 332. Make-up water can be fed into the closed system through the deaerator. The make-up water is preferably routed through a purification system prior to entry into the closed system.

In certain embodiments, the boiler is capable of continuously generating 190,000 pounds per hour to 220,000 pounds per hour of steam while operating at a pressure of 900 pounds per square inch gauge (psig) at the superheater outlet and a temperature of 900 degrees Fahrenheit steam temperature at the superheater outlet. In certain embodiments, the boiler is operated at a pressure of 800-1,000 psig, or 850-950 psig, or around 900 psig at the superheater outlet. Also, in certain embodiments, the output steam from the superheater outlet has a temperature of 800-1,000 degrees Fahrenheit, or 850-950 degrees Fahrenheit, or about 900 degrees Fahrenheit.

Corn residue has relatively high concentrations of alkali and alkaline-earth elements (e.g., potassium, phosphorous, sodium, magnesium, and calcium). Corn residue also has a high concentration of amorphous silica. This provides an increased potential for a high degree of ash deposition within the boiler (e.g., on the boiler tubes, superheater and other structures of the boiler). Deposition layers formed on the components of the boiler insulate the boiler components thereby negatively affecting the heat transfer efficiency of the boiler. Ash deposition rates are dependent upon exhaust temperature. In this regard, it has been determined that ash deposition rates resulting from the combustion of corn residue are manageable if the furnace 300 is operated such that the furnace 300 target furnace exit gas temperature (FEGT) is preferably less than 1800 degrees Fahrenheit, and more preferably less than 1700 degrees Fahrenheit. The FEGT is the temperature of furnace exhaust gas which exits the furnace 300 through a furnace outlet 340 and enters the boiler 302. In certain embodiments, the FEGT is in the range of 1,400 to 1,800 degrees Fahrenheit. In a preferred embodiment, the FEGT is in the range of 1,400 to 1,700 degrees Fahrenheit. Soot blowers can also be used to help remove ash deposits.

Upon exiting the boiler 302, the furnace exhaust gas can pass through the heat exchanger 310 to preheat the combustion air being fed into the furnace 300 below the stoker grate 304. From the heat exchanger 310, the exhaust gas passes through an ash removal component 342. In a preferred embodiment, the ash removal component includes a cyclonic particulate separator that removes ash from the exhaust gas stream by centrifugal action and discharges the ash through an ash outlet 343. The exhaust gas exits the particulate removal component 342 at an exhaust outlet and passes through the heat exchanger 338 where heat from the exhaust gas is used to preheat the feed water being routed from the condenser through the deaerator to the mud drum 332. An acid treatment station 347 is provided downstream from the heat exchanger 338 for neutralizing acid (e.g., hydrochloric acid) in the exhaust stream by the addition of a base material (e.g., sodium bicarbonate). An induced flow fan 344 is positioned downstream from the acid treatment station 347 for pulling the exhaust flow through the system such that a slight vacuum is provided at the furnace 300.

Downstream from the fan 344 is a re-circulated air access location 346 where a portion of the exhaust gas is diverted from the exhaust stream and re-circulated back to the furnace 300. As shown in the depicted embodiment, the diverted exhaust gas can be directed to the pneumatic fuel distribution system 320. In this way, the recirculated air is injected into the furnace 300 above the stoker grate as part of the fuel delivery process. The diverted exhaust gas can also be injected into the furnace 300 through the nozzles 314 provided at the upper combustion region 312. A precipitator 348 is downstream from the re-circulated air access location 346. The precipitator 348 functions to precipitate fly ash as well as material neutralized at the acid treatment station 346. The precipitated material is collected in hoppers. A conveyor can be used to move the ash collected at the particulate removal component 342 and the precipitate material collected at the precipitator to an ash collection silo 350. From the precipitator 348, the exhaust can be directed to an outlet stack 356

It has been determined that the ash has considerable nutrient value that makes it suitable for use as a fertilizer. The primary constituent of the ash includes a silica based compound (e.g., $SiO_2$). Silica based compounds typically constitute over 30% of the ash. Additionally, potassium based compounds (e.g., $K_2O$) can constitute at least 30% of the ash, phosphorus based compounds (e.g., $PTO_5$) can constitute at least 5% of the ash and carbon based compounds can constitute at least 5% of the ash. Other chemicals present in the ash include $Al_2O_3$, $Fe_2O_3$, $TiO_2$, $CaO$, $MgO$ and $Na_2O$. In certain embodiments, the collected fly ash is conveyed to a pelletizer 352 (e.g. pelletizing mill) where the ash is compacted into pellets. The pellets can be sold in bulk or bagged and sold as fertilizer or soil additive.

It is also possible to co-fire the above-ground corn residue in the furnace 302 with a secondary fuel source. For example, FIG. 14 shows an optional secondary fuel source 360 for delivering a secondary fuel to the fuel metering arrangement 322. Preferably, the above-ground corn residue remains the primary fuel source with a smaller amount of the secondary fuel being mixed with the above-ground corn residue. In certain embodiments, the secondary fuel has a higher BTU value than the above-ground corn stover. An example of a higher BTU value secondary fuel comprises excess or waste seed (e.g., corn seed, soybean seed, etc.) from a seed company. In certain embodiments, the waste seed can be chemically treated seed that has been treated with a pesticide, a fungicide or another type of chemical treatment. The blended fuel resulting from the mixture of corn stover with the secondary fuel preferably has an average piece length less than 3 inches with no more than 25 percent by weight being less than 0.25 inches in length. In certain embodiments, the blended fuel mixture has a composition including at least 75 percent by weight that is less than 3 inches in length and no more than 25 percent by weight that is less than 0.25 inches in length.

The above specification provides examples of how certain aspects may be put into practice. It will be appreciated that the aspects can be practiced in other ways than those specifically shown and described herein without departing from the spirit and scope of the present disclosure.

What is claimed is:

1. A method for combusting corn stover to produce heat for generating steam, the method comprising:
    combusting the corn stover in a furnace to produce heat;
    using the heat from the combustion in the furnace to generate steam in a boiler, wherein the boiler includes a superheater and steam tubes provided in a common housing;
    reducing ash deposition within structures of the boiler by operating the furnace such that the furnace provides outlet exhaust gas having an outlet exhaust gas temperature in the range of 1400 degrees F. to 1800 degrees F. to the boiler;
    operating the furnace and the boiler such that the boiler provides a steam pressure in the range of 800-1000 psig at the superheater outlet;
    operating the furnace and the boiler such that the boiler provides a steam temperature in the range of 800-1000 degrees F. at the superheater outlet;
    operating the furnace and the boiler to continuously generate 190,000 pounds to 220,000 pounds of steam per hour;
    directing the steam from the super heater outlet in the common housing with the boiler directly to a steam turbine to drive a generator;
    routing the outlet exhaust gas from the furnace to a heat exchanger; and circulating the cooled outlet exhaust gas from the heat exchanger back to the furnace.

2. The method of claim 1, wherein the corn stover is the primary fuel combusted in the furnace during normal operation of the furnace.

3. The method of claim 1, wherein the corn stover is the only fuel combusted in the furnace during normal operation of the furnace.

4. The method of claim 1, wherein the corn stover combusted in the furnace is a mixture of corn stover pieces having an average length less than 3 inches with no more than 25 percent of the corn stover pieces being less than 0.25 inches in length.

5. The method of claim 1, wherein the corn stover combusted in the furnace is a mixture of corn stover pieces having a composition including at least 75 percent by weight that is less than 3 inches in length and no more than 25 percent by weight that is less than 0.25 inches in length.

6. The method of claim 1, wherein a mixture of the corn stover and waste seed from a seed company are combusted in the furnace, wherein the mixture has a composition including at least 75 percent by weight that is less than 3 inches in length and no more than 25 percent by weight that is less than 0.25 inches in length.

7. The method of claim 1, wherein the furnace is operated such the outlet exhaust gas has a temperature less than or equal to 1700 degrees F.

8. The method of claim 1, wherein a mixture of the reduced corn stover and waste seed from a seed company is combusted in the furnace.

9. The method of claim 8, wherein the waste seed is selected from the group consisting of seed corn and soybean seed.

10. The method of claim 9, wherein the boiler provides a steam pressure of 900 psig at a superheater outlet and temperature of 900 degrees F. at the superheater outlet.

11. The method of claim 1, wherein the outlet exhaust gas and exhaust gas stream from the furnace includes fly ash, wherein the fly ash contains potassium, phosphorous and carbon, and wherein the fly ash is collected and sold as a fertilizer.

12. The method of claim 1, further comprising removing ash from the heated outlet exhaust gas before circulating the heated outlet exhaust gas back to the furnace.

13. The method of claim 12, further comprising distributing the corn stover in the furnace using a vibrating grate of a stoker, and wherein the heated outlet exhaust gas is directed to the furnace at a location beneath the grate such that combustion air flows upwardly through the grate during the combustion of the corn stover.

14. The method of claim 13, further comprising combusting suspended fuel particles and combustible gases in an upper combustion region of the furnace above the grate.

15. The method of claim 1, wherein the outlet exhaust gas having the outlet exhaust temperature in the range of 1400 degrees F. to 1800 degrees F. is provided from the furnace to the boiler such that the exhaust gas initially flows across the superheater of the boiler and then flows across steam tubes of the boiler.

16. The method of claim 15, wherein the outlet exhaust gas having the outlet exhaust temperature in the range of 1400 degrees F. to 1800 degrees F. is directly received by the boiler from an outlet of the furnace.

17. The method of claim 16, wherein the outlet exhaust gas having the outlet exhaust temperature in the range of 1400 degrees F. to 1800 degrees F. flows from the outlet of the furnace through a $NO_x$ removal station to the boiler.

18. The method of claim 1, wherein the cooled outlet exhaust gas from the heat exchanger is circulated directly from the heat exchanger to the furnace.

19. The method of claim 1, further comprising drawing combustion air from a building housing the furnace to the heat exchanger.

20. The method of claim 19, wherein the combustion air from the building housing the furnace is preheated by the heat exchanger that receives the exhaust gas from the furnace.

* * * * *